United States Patent [19]

East

[11] Patent Number: 4,796,738

[45] Date of Patent: Jan. 10, 1989

[54] CONTROLLABLE CLUTCH

[75] Inventor: Gregory M. East, Santee, Calif.

[73] Assignee: J. C. Pemberton, La Mesa, Calif.; a part interest

[21] Appl. No.: 50,791

[22] Filed: May 13, 1987

Related U.S. Application Data

[63] Continuation-in-part of Ser. No. 857,218, Apr. 30, 1986, abandoned.

[51] Int. Cl.$^4$ .................... F16D 13/00; F16D 15/00; F16D 43/00
[52] U.S. Cl. .................... 192/20; 192/30 R; 192/35; 192/45; 192/52; 192/82 P; 192/89 R
[58] Field of Search .................... 192/20, 35, 38, 44, 192/45, 52, 71, 74, 79, 82 P, 89 R, 30 R, 31, 32; 74/530, 531, 773, 803, 110; 188/67, 382

[56] References Cited

U.S. PATENT DOCUMENTS

| | | | |
|---|---|---|---|
| 1,517,470 | 12/1924 | Slater | 188/67 |
| 1,947,703 | 2/1934 | Fishburn | 192/45 |
| 2,735,525 | 2/1956 | Martindell | 192/71 |
| 3,096,852 | 7/1963 | Harwood | 188/382 |
| 3,306,410 | 2/1967 | Hare | 192/38 |
| 3,330,171 | 7/1967 | Nasvytis | 74/801 |
| 3,548,673 | 12/1970 | Suchocki | 74/53 |
| 3,830,116 | 8/1974 | Fisher | 74/773 |
| 3,948,372 | 4/1976 | Hare | 192/45 |
| 3,993,177 | 11/1976 | Gehrke | 192/45 |

FOREIGN PATENT DOCUMENTS

| | | |
|---|---|---|
| 950237 | 7/1974 | Canada . |
| 337484 | 6/1921 | Fed. Rep. of Germany . |
| 1142083 | 1/1963 | Fed. Rep. of Germany . |
| 355194 | 8/1905 | France . |
| 400290 | 5/1909 | France . |
| 278427 | 10/1927 | United Kingdom . |
| 539223 | 9/1941 | United Kingdom . |
| 818502 | 8/1959 | United Kingdom . |

*Primary Examiner*—Leslie A. Braun
*Assistant Examiner*—David A. Testardi
*Attorney, Agent, or Firm*—Warren T. Jessup

[57] ABSTRACT

A mechanical clutch which is selectively engageable and disengageable. Interposed between an input member and an output member are a plurality of clutch rollers. In disengaged mode they rotate freely, relative to the members. In engaged mode they bunch together, thereby locking together and to the members, all of which then move together as a unit. A control member is applied to the clutch rollers to either engage or disengage the clutch. The movement of the members may be rotary or linear.

16 Claims, 12 Drawing Sheets 4,796,738

CONTROLLABLE CLUTCH

This is a continuation in part of application Ser. No. 06/857,218, filed 04/30/86, now abandoned entitled Controllable Clutch, Gregory M. East, applicant.

BRIEF SUMMARY OF THE INVENTION

This invention is embodied in a mechanical clutch capable of transferring a large force or torque from an input member to an output member by the application of a very small control force or torque. This clutch is capable of performing many non-slipping power engagements per second. When configured as a following mechanical servo, this clutch becomes the crux of a continuously variable transmission (CVT) suitable for automotive use. In such use, mechanical power may be transferred very precisely by a controlling power of much lower level than the power being transmitted through the clutch mechanism. The automotive literature shows many articles which propose 20%-25% fuel efficiency improvement obtained by using a continuously variable transmission (CVT).

Today's commercial CVT's have a stepless changing mechanical advantage which is a function of variable pitch diameter ratios, as with wide Vee belts, traction drives. All of these have insufficient power ratings for automotive use. The hydrostatic CVT's operate by the exchange of variable fluid volumes, and have power ratings to drive earth movers. But they suffer from low efficiency and high cost.

The present invention is analogous to the electrical pulse driven dc motor drives used on computer-controlled machine tools. When used for an automobile transmission, it makes use of the inherent engine fly wheel energy and transfers this energy to the wheels. This is similar to the energy transfer which takes place in a punch press, which uses a drooping torque-speed motor to build up energy in the fly wheel and a one turn clutch, which is engaged to cause a very high force on the work piece. In the reduction to practice of this invention, the following servo CVT produced good acceleration in a Chevrolet delivery panel, thus providing a new basic concept in rotational power transfer with torque increases. This clutch may form the heart of: (1) a continuously variable transmission (CVT); (2) a disengageable overruning clutch; (3) a one turn clutch or sub-division of one turn; (4) a high power stepping motor replacement. (5) storage and retrieving fly wheel energy.

BRIEF DESCRIPTION OF THE DRAWINGS

FIG. 1 schematically illustrates the principles of the present clutch invention, in the application of power from an input to an output member which move linearly. In practical application the greater use of the invention will be in rotating movement.

FIG. 5 consists of FIGS. 5A and 5B and illustrates a still further embodiment somewhat along the lines of FIG. 4.

FIG. 8 consists of FIGS. 8A, 8B, 8C, 8D, 8E, and 8F, and illustrates another embodiment showing a complete clutch and the mechanism for its control.

FIG. 10 illustrates a linear form of the invention and is intended basically to demonstrate the principles of the invention.

FIG. 14, consisting of FIGS. 14A and 14B, is another embodiment of the invention shown generally in FIG. 13.

FIG. 15 consists of FIGS. 15A and 15B and shows a still further embodiment of the invention illustrated generally in the immediate previous figures.

FIG. 23, consists of FIGS. 23A and 23B, shows an alternative way of coupling the load clutch rollers to the output, being essentially a modification of FIG. 7.

FIG. 24, consists of FIGS. 24A, 24B and 24C is a further alternative coupling method somewhat akin to FIG. 23.

DETAILED DESCRIPTION

There is shown in FIG. 1 a somewhat schematic representation of mechanical components illustrating the fundamental principles involved in this clutch invention. FIG. 1 is not intended to represent an actual structure, but rather to introduce the concepts embodied in this invention.

Figure 1A:
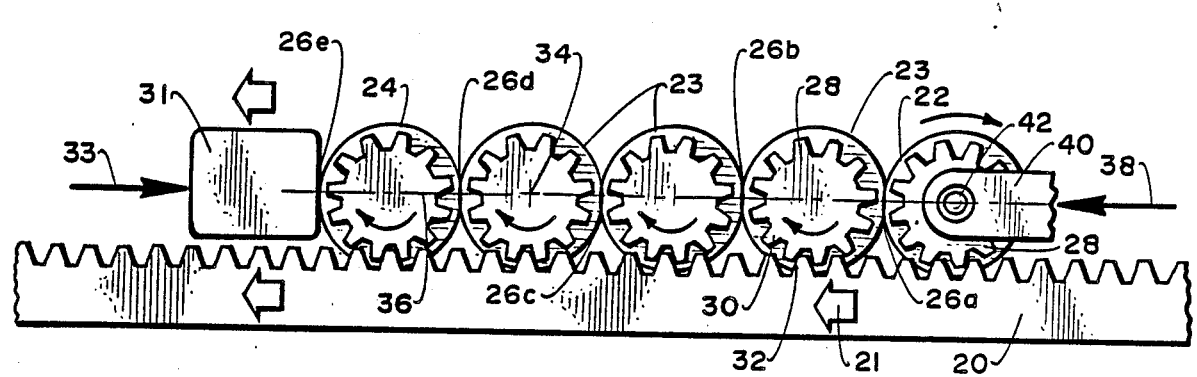
FIG. 1 consists of FIGS. 1A and 1B.
FIG. 1B is a fragmentary elevation view which shows a clutch control force being the reverse of that shown in FIG. 1A.
Figure 20:
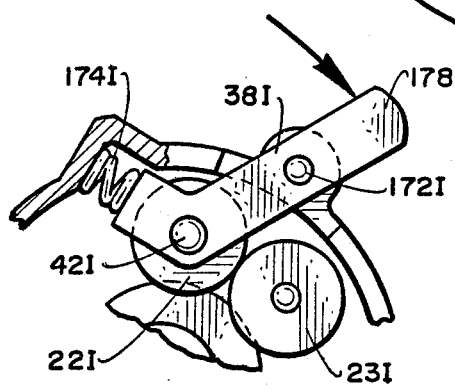
FIG. 20 is a fragmentary view illustrating a modification of the structure shown in FIG. 19.

FIG. 1. In FIG. 1A, 20 represents an input member, shown as a rail in the form of a toothed rack, movable linearly from right to left, as shown by arrow 21. Resting on the rail 20 are a plurality of clutch rollers 22-24. The rollers as shown as circular surfaces of revolution in the form of cylinders which are capable of frictionally engaging each other at their contiguous peripheral points (or lines) 26. The respective roller axes 34 of the rollers are disposed on a clutch roller line 36, substantially paralleling the linear rail 20. Means are provided for coupling the input rail 20 to the clutch rollers 22-24 for imparting clockwise rotation to the clutch rollers upon linear movement of the input rail 20 from right to left. In FIG. 1A, such means comprises a toothed engagement. Affixed to each roller 22-24 is a gear 28 (note FIG. 3A) concentric with the roller and having teeth 30 which mesh with the teeth 32 of the rack 20. Numeral 31 represents an output member which imposes a load, represented by the arrow 33, upon the clutch. The clutch transmits a force from the input 20 to the output 31 via the rollers 22-24.

In declutched mode, the rollers 22-24 are free to rotate and rub lightly against each other and against the output member 31, being rotated by the right to left movement of the input rack 20 and the meshing of the gear teeth 32/30. At the engaging points 26, the respective peripheries of the rotating rollers are moving in opposite directions, but without significant force tending to bunch or bind the rollers together. The traction at 26 is minimal and made more so by the presence of an oil bath, which is the preferable environment in which the rollers turn.

In the declutched mode, the input rail 20 moves from right to left, causing the rollers 22-24 each to rotate clockwise, but imposing minimal output force against the load 33, because of the minimal traction at the peripheral engagement points 26. The rollers 22-24 are free to move slightly toward and away from each other along roller line 36. Although in operation this movement is quite small, it is enough to create a condition varying from virtually no load transmission, to full load transmission, when the rollers are bunched frictionally against each other and are locked against rotation, as will now be explained.

Transition from declutched to clutched mode in FIG. 1A is effected by causing the clutch rollers to bunch frictionally together and bind against rotation. This is done by applying a leftward, control force to the control clutch roller 22 at the right end of the clutch roller line 36. This control force, represented by the arrowed line 38, causes the roller 22 to move slightly to the left and bear firmly against the adjacent roller 23, where the two peripheries engage at 26. This increases the friction between the opposite moving peripheries, and inhibits rotation of the rollers 22 and 23. With free rotation inhibited, the input rail 20 applies a linear force, from right to left, against the rollers 22 and 23 by virtue of the coupling at the teeth 32/30. This movement then rapidly cascades from right to left, with one roller 23 bunching up against the adjacent roller to the left and so on down the line, until the load clutch roller 24, at the left end of the line 36, is forced firmly against the output member 31. The entire clutch roller assembly 22-24 is thus solidly locked to the member 31 and to the input rack 20. The clutch is now fully engaged, within binding friction at 26 between the previously turning rollers. Thus, the full force of the right to left movement of the input rail 20 is imposed against the load 33, and the entire assembly moves as a unit to the left, against the load force 33.

Imposition of the initial leftward movement of the control clutch roller 22, at the right hand end of the cascaded roller assembly is imparted, in the example of FIG. 1A, by a gudgeon member 40 journaled to an axle 42, on which the control roller 22 is mounted. Member 40 is preferably linked to output member 31 in such a way that it may be moved selectively toward the adjacent clutch roller 23 by the control force 38. Movement of member 40 to the left with respect to the output member 31 bunches the rollers 22-24 together and against the output member 31. The bunching action, once started, cascades extremely rapidly. A small force at 38 quickly multiplies into a tight locking action, as the input rail 20 moves the clutch rollers toward each other, into firm friction engagement, once the locking action starts.

Figure 1B:
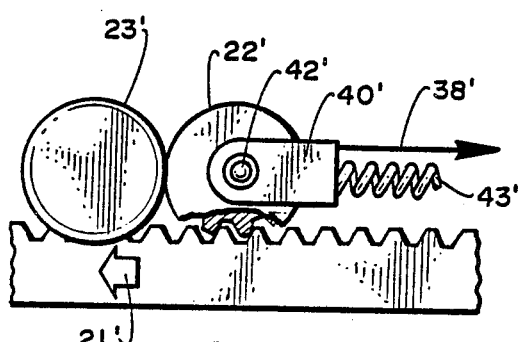

FIG. 1B is a fragmentary view of the control roller 22 and the adjacent clutch roller 23. The function of all of the parts shown is identical to the parts shown in FIG. 1A except that the force biasing spring 43 has been added and the control force vector 38 has been reversed. This reversal increases the design opportunities of control means. The spring 43 exerts sufficient force on the gudgeon 40 to cause the clutch roller cascade to solidly lock up and thus cause the clutched mode. The clutch can now be controlled by the reversed control force 38.

FIGS. 1A and 1B show that a clutch control force can be used to either cause the clutch cascade rollers to selectively move toward the adjacent rollers (clutched mode) or to move away from the adjacent rollers (declutched mode).

To explain in much greater detail, referring to FIG. 1, the operable state of the clutch is defined in terms of the relative motion between the members 20 and 31. The clutch is operable as a controllable clutch when 20 has a motion with respect to 31 which is right to left, or when 31 has a motion with respect to 20 which is left to right. For the opposite directions of relative motion, the structure is inoperable as a clutch.

In declutched mode, consider initially only the members 20, 31 and the geared clutch roller 24. Roller 24 is free to move slightly away from 31 along roller line 36. When 20 has a motion with respect to 31 which is right to left, 20 urges 24 to rotate in a relative clockwise direction and in light rubbing contact with 31 at 26e. This is by virtue of a toothed engagement of 24 with 20 at 30/32. If free rotation of 24 is inhibited relative to 20, the toothed engagement of 20 with 24 will urge 24 to move linearly with 20. Because 24 and 31 are in abutting contact, 31 is also urged to move linearly with 20, in a right to left direction.

Figure 3A:
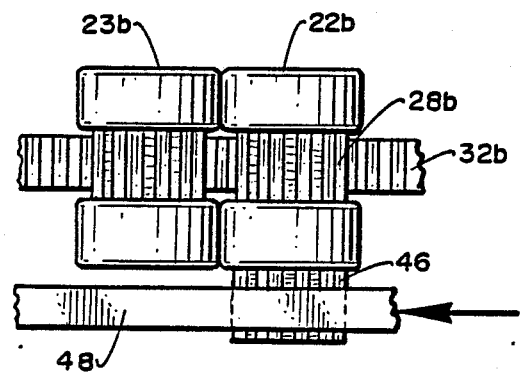
FIG. 3 consists of FIGS. 3A and 3B; the former being a plan fragmentary view of a modification of the FIG. 1 structure.
FIG. 3B being an elevation of the same. This figure illustrates another method, alternative to FIG. 2, of initiating the clutching action.

The number of rollers 23 is in no wise critical, and may be more or less than shown in the drawings. The more rollers there are, the more the clutch will approach a self-engaging, one way clutch. Consider more geared clutch rollers 23 added to the arrangement and positioned to the right of roller 24. The construction of these rollers is such that their respective gear teeth 30 engage the teeth 32 of 20, but do not touch each other. A practical construction is illustrated in FIG. 3A, wherein the major gear tooth diameter of gear 28 is smaller than the cylindrical roller diameter.

For this mode of the clutch, 20 may be referred to as the Input and 31 as the Output; motion of 20 with respect to 31 is right to left. Both rollers 24 and 23 will rotate freely in a clockwise direction. Just as 24 rotates in light rubbing contact with 31 at location 26e, so 23 rotates in light rubbing contact with 24 at location 26d. Roller 23 is free to move slightly toward and away from roller 24 along roller line 36. Considering the contact location 26d of rollers 24 and 23, it is seen that their respective roller peripheries are moving in opposite directions. These oppositely moving peripheries tend to induce a binding force which has a tendency to inhibit the free rotation of rollers 24 and 23. However, with only rollers 24 and 23 in the series, there is not sufficient friction force to cause the clutch to bind and bunch or lock together.

Remembering that the operable state of the clutch is established by the relative motion between 20 and 31, the operable direction may be reversed. That is, by moving 31 in a left to right direction relative to 20, 31 may now be referred to as the Input and 20 as the Output. By this, the geared rollers 24 and 23 will be urged by 31 to move in a left to right direction and to rotate in a clockwise direction by virtue of the toothed engagements of 24/23 with 20 at 30/32. The rollers 24 and 23 will thus move along 20 as wheels would roll along the ground.

Additional rollers 23 may be added and positioned to the right of 24/23, and the above declutched mode will prevail. However, additional rollers 23 may be added in sufficient numbers to cause the clutch to become self-engaged by virtue of the binding forces induced at the locations 26. The presence of an oil bath will reduce the forces to a degree such that several rollers may be added to the series and the rollers will run freely because the resulting oil film tends to separate the rollers. In the event that an oil bath is impractical or undesirable, the above declutched mode would still be maintained by the presence of fewer clutch rollers 23.

In describing the clutched mode, it will be beneficial to examine the binding forces which tend to inhibit free rotation of the clutch rollers, as well as the linear contact forces which bunch the rollers into binding engagement at the locations 26. The schematic representation of FIG. 1 shows a clutch consisting of five clutch rollers and the member 31. The terminal clutch roller 22 at the right end of the clutch roller line 36, and the adjacent clutch roller 23, have, when declutched, oppositely moving peripheries, as do all of the remaining clutch rollers 23-24. The arrangement of FIG. 1 will run freely as shown when member 20 moves right to left with respect to 31. Now assume the presence of the restraining force 33 imposed upon member 31 as shown. As the control force 38 urges roller 22 into more forceful contact with the adjacent roller 23, the binding force at location 26a increases and free rotation of the rollers 22/23 is inhibited. With control force 38 still being applied, member 20 urges the rollers 22/23 into even heavier contact with the next roller 23 in the series and with a force of greater magnitude than the control force 38. The binding engagement at location 26b is much greater than the binding engagement at location 26a. With control force 38 still being applied, member 20 then urges roller 22 and both rollers 23 into still heavier contact with the next roller 23 to the relative left, thus establishing a still greater binding engagement at the location 26c. These contact forces cascade, increasing from roller to roller by virtue of the toothed engagements of rollers 22/23/23 with 20 at 30/32, as does the binding engagements at the locations 26 until member 20 has urged all of the clutch rollers into forceful contact with member 31. The magnitude of the force urging roller 24 into contact with 31 and against the restraining force 33 is many times the magnitude of the control force 38 being imparted to roller 22.

In FIG. 1, assuming that vector 33 represents a load against which 31 may act, a control force 38 of relatively small magnitude will cause all roller rotation to cease and member 20, rollers 22-24 and member 31 will lock together as a unit, by virtue of the toothed engagements of rollers 22-24 with 20 at 30/32, and the binding engagement at locations 26; and the force of member 20 will be transmitted to member 31 and thus imparted to the load represented by vector 33.

As mentioned earlier in describing declutched mode, the rollers 22-24 are free to move slightly toward and away from each other along roller line 26. Although in operation this movement is quite small, it is enough to create a condition varying from virtually no load transmission, to full load transmission, and clutch engagement is extremely rapid. Further, because of the practically instantaneous engagement, and because of the relatively low controlling force required to induce engagement, the present controllable clutch may be cycled very rapidly.

Figure 2:
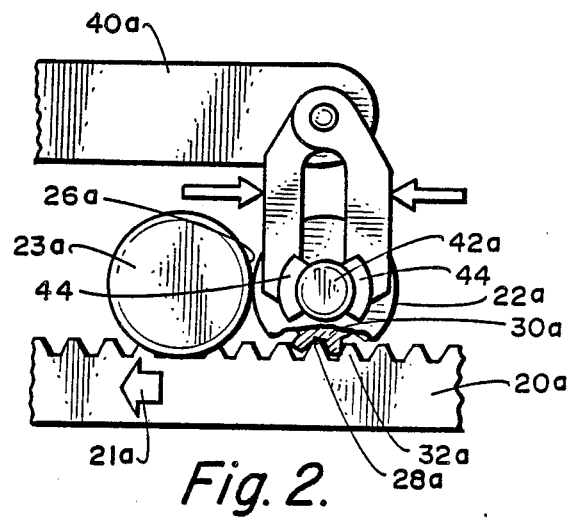
FIG. 2 shows a modification of the schematic of FIG. 1, illustrating how the clutching may be initiated.

FIG. 2. The bunching action of the rollers may be instituted either by linearly moving the end control roller 22 toward the other rollers, along the end control roller 36, as shown in FIG. 1; or by a braking action which inhibits the free rotation of the control roller 22. This latter mode of initiating the clutching action is shown in FIG. 2, wherein parts corresponding to those in FIG. 1 carry the same numerals with an alphabetic postscript.

In FIG. 2, the initiating member is shown as a member 40a, carrying a pair of pivotally mounted brake shoes 44, which embrace the axle or shaft 42a of the roller 22a. Application of a slight braking action by the shoes 44 against the axle 42a inhibits the clockwise rotation of the roller 22a, whereupon the coupling at 32a/30a from the rail 20a to the roller gear 28a applies a linear force from right to left against the roller 22a and imparts binding at 26a between the rollers 22a and 23a.

This binding action very rapidly multiplies and cascades from right to left to the load member 31, so that, as in FIG. 1, the load becomes locked to the input rail 20 and moves therewith from right to left.

Figure 3B:
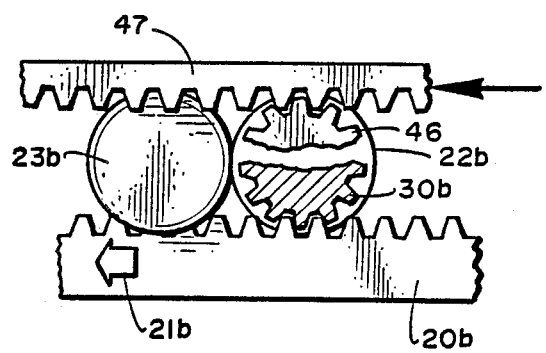

FIG. 3. A variation of the control method of FIG. 2 is shown in FIG. 3, consisting of FIGS. 3A and 3B, the former being a fragmentary plan view of the control means and the latter a fragmentary elevation. In these figures, the roller 22*b*, in addition to being provided with the gear 28*b* which meshes with the rack teeth 32*b*, is also provided at one end of its axle, with another gear 46, which meshes with an auxiliary rail 48. The auxiliary rail 48 is linked to the input rail 20*b* so as to move synchroniously, but in the opposite direction. Thus, there is no linear force on the control roller 22*b*, and, in the declutched mode of the clutch, all of the rollers are free to rotate.

The linkage between 48 and 20*b* is provided with means for applying a braking or restraining force to the auxiliary rail 48 so that it may be caused to move slower than the rail 20*b*.

When 48 moves slower than 20*b*, it instantly puts a braking action on the gear 46 and on the roller 22*b*. Just as in the case of FIG. 2 this tends to lock the roller 22*b* to the rail 20*b* as the rail moves from right to left. This locking action is quickly transmitted from right to left through the rollers 23 and 24 to the load 31, and the entire assembly locks up solidly, as in the embodiments in FIGS. 1 and 2.

Figure 4A:
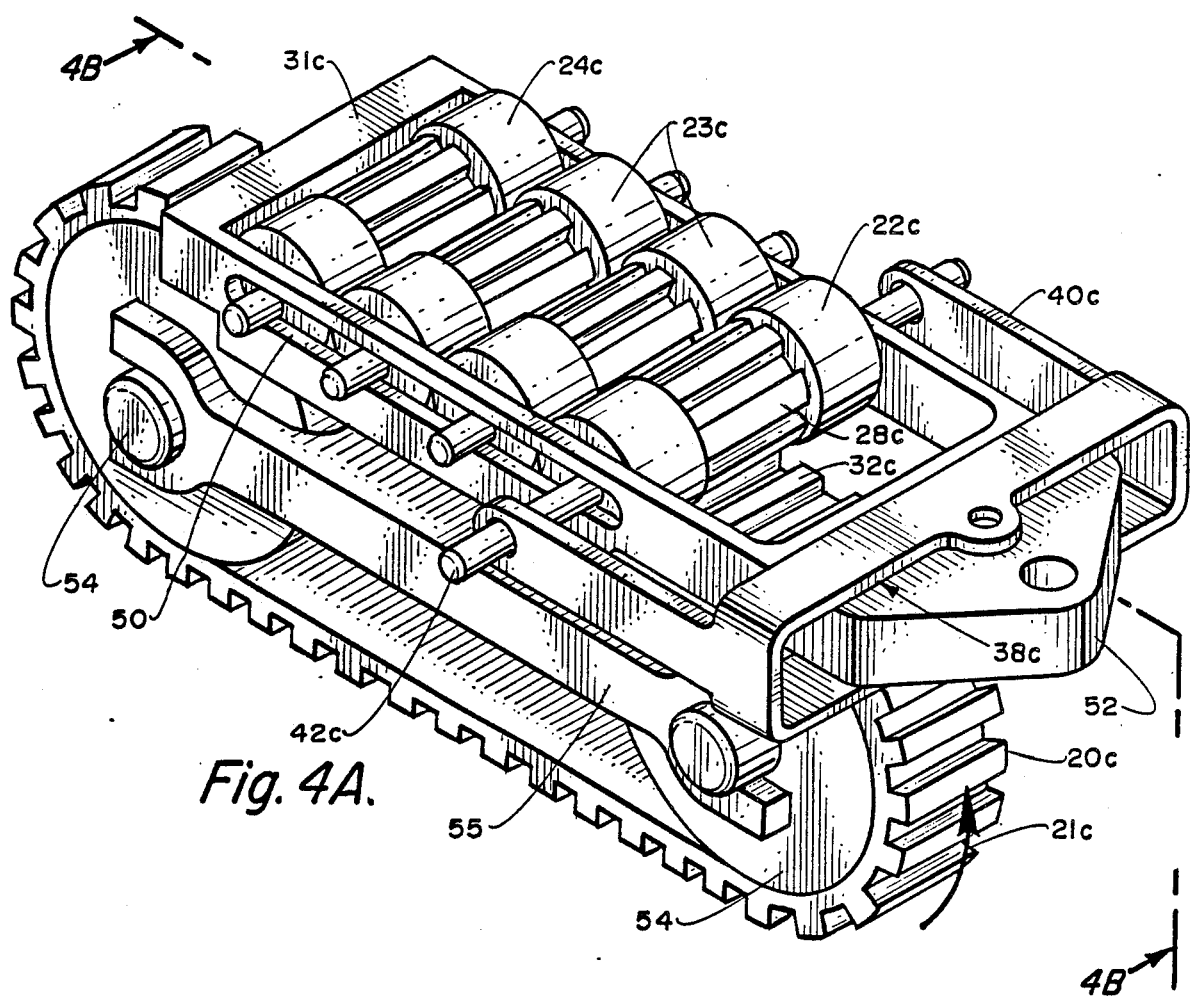
FIG. 4 consists of FIGS. 4A and 4B; the former being an isometric view generally along the lines of FIG. 1, but showing a more concrete structural embodiment.
FIG. 4B is a crosssectional elevation taken on line 4B—4B in FIG. 4A.
Figure 4B:
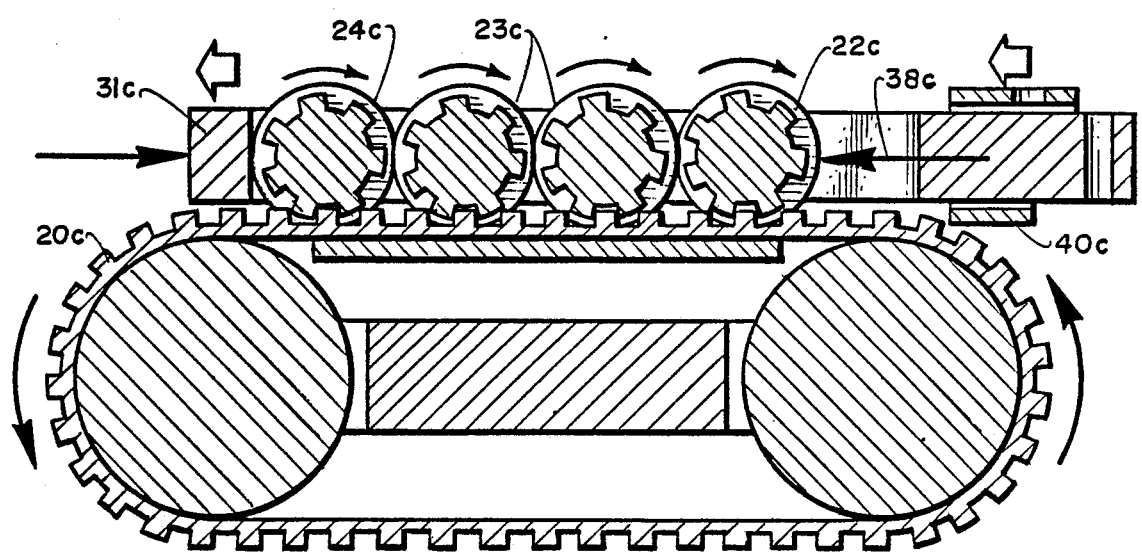

FIG. 4. Another embodiment of the invention is shown in FIG. 4, consisting of FIGS. 4A and 4B, the former being an isometric view and the latter an elevational section. The rail input member is shown in the form of a belt loop 20*c*, having rack teeth 32*c*, which mesh with the gears 28*c* of the line of rollers 22*c*–24*c*. The loop belt/rail 20*c* is mounted on and extends between a pair of pulleys or rollers 54 rotatably mounted in a frame 55. One or both of the pulleys 54 may be powered to cause the belt to rotate in the direction shown by the arrow 21*c*.

The clutch rollers 22*c*–24*c* are maintained in position by having their axles or shafts mounted in a longitudinal slot 50, formed in the longitudinal side arms of a frame 52, the left end of which constitutes the output load member 31*c* of the clutch. Control is imparted through a yoke 40*c* slideably mounted on the frame 52 and having its ends journaled to the shaft 42*c* of the control clutch roller 22*c*. A small force 38*c* imposed from right to left between the frame 52 and the yoke 40*c* imparts the necessary leftward movement of the clutch roller 22*c* against the adjacent roller 23*c*. This movement is rapidly cascaded from right to left, forcing the other end roller 24*c* against the load member 31*c*, and tightly locking the output frame 52 to the rack/belt 20*c*.

Figure 5A:
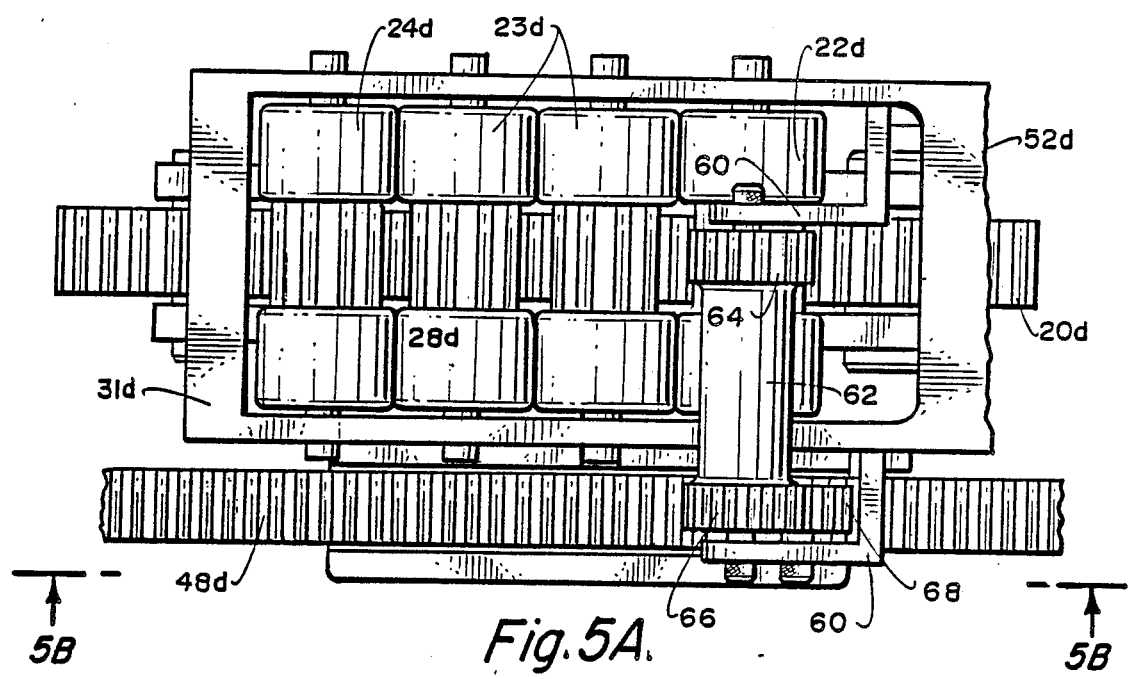
FIG. 5A is a plan view and FIG. 5B is an elevation.
Figure 5B:
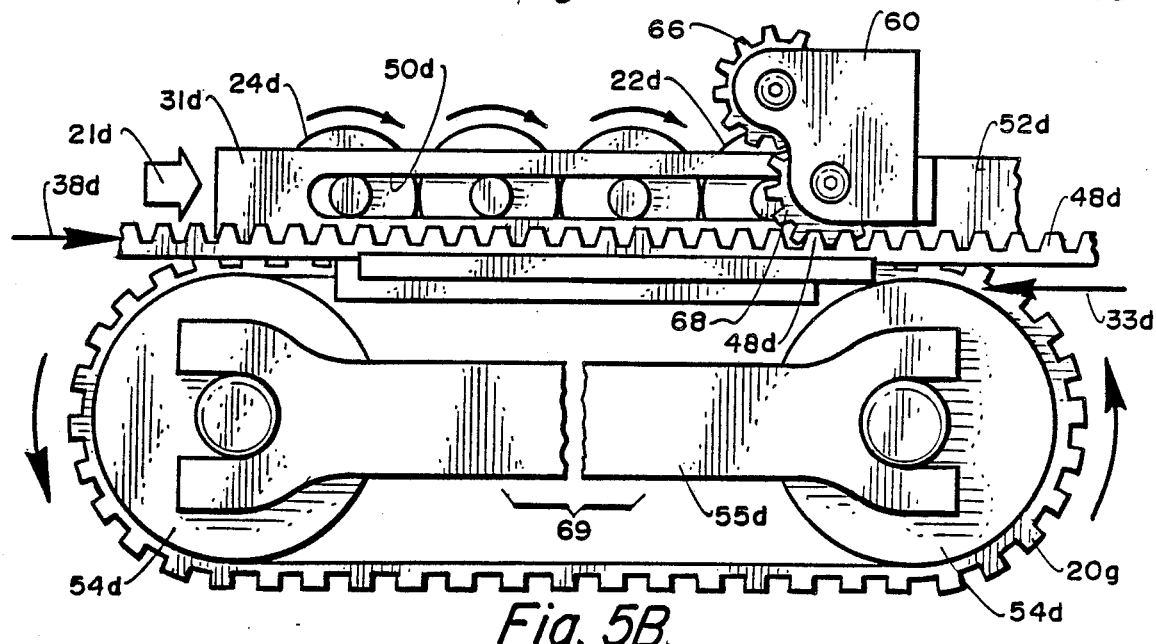

FIG. 5. In the embodiments thus far described, the rack 20 has served as the input, and the member 31/52 has served as the output. The roles may be reversed if desired, as shown in FIG. 5, consisting of FIGS. 5A and 5B, the former being a plan view and the latter an elevation.

In FIG. 5 the belt rail 20*d* is similar to the belt rail 20*c* of FIG. 4, except that it now is an output member, receiving power from the input frame 52*d*, moved from left to right, as shown by the power input arrow 21*d*. The belt rail 20*d* is supported by and extends between pulleys or rollers 54*d*, and output power is taken from one or both of these pulleys.

As in FIG. 4A, the frame 52*d* confines the rollers 22*d*–24*d* in a slot 50*d*, and the gears 28*d* of the rollers mesh with and rest on the rail belt 20*d*. The frame 52*d*, now serving as the input member, is provided with spaced plates 60, in which are journaled a pair of meshing idler gears. The first of these gears, 62, is provided at one end with gear teeth 64 which mesh with the gear 28 (not seen) of the roller 22*d*. At the other end, the gear 62 is provided with teeth 66, which mesh with another idler gear 68, also journaled in the plates 60 and which, in turn, meshes with a control rack 48*d*.

In operation, in the declutched mode, the input frame 52*d* moves from left to right, as shown by the input arrow 21*d*. The output rack/belt 20*d* being quiescent, the coupling between the clutch rollers 22*d*–24*d* and the rack 20D causes each of the rollers to rotate in a clockwise direction, must as the wheels on a vehicle rotate when the vehicle is pushed along a roadway. This imparts counterclockwise rotation to the gear 62, which in turn imparts clockwise rotation to the idler intermediate gear 68. The clockwise rotation of 68 allows it to roll along in the gear teeth of the control rack 48*d* without encountering significant resistance.

If now a control force 38*d* is applied from left to right against the control rack 48*d*, a counterclockwise torque is imposed on the idler gear 68, which is transmitted into a counterclockwise torque on the control roller 22*d*, in opposition to its free running clockwise rotation in the belt rack 20*d*. This imparts a linear force from right to left, causing the roller 22*d* to bunch to the left against the adjacent roller 23*d*. This bunching is very rapidly cascaded, to jam all of the clutch rollers to the left against the load member 31*d* of the frame 52*d*. This locks the frame 52*d* to the belt rail 20*d*, and causes the top portion of the belt rail 20*d* to be locked to, and moved with, the frame 52*d* from left to right, putting an output torque on the output rollers 54*d*. In practical application the frame 55*d* holding the pulleys 54*d* would be quite long, as represented by the break at 69.

Figure 6:
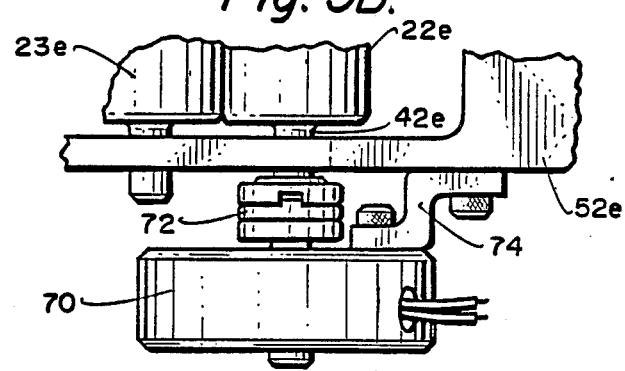
FIG. 6 is a fragmentary plan view showing an alternative method of instituting the clutching action in the structure of FIG. 5.

FIG. 6. The control shown in FIG. 5 is an adaptation of the control method shown in principle in FIG. 3, which in turn is a variant on the braking principle shown in FIG. 2. Another variant of the braking method shown in FIG. 2 is shown in FIG. 6, as it might be applied, for example, to the embodiment shown in FIG. 2, in which a restraining brake or drag is applied to the axle or shaft 42*a* of the roller 22*a* by the brake shoes 44. In FIG. 6, this drag torque is applied to the shaft 42*e* of the control roller 22*e* by a torque motor 70 coupled to the shaft 42*e* by a coupling 72. The coupling 72 is a flexible coupling which can accommodate for any slight axial misalignment between 22*e* and 70, thus applying pure torque to the shaft or axle 42*e* and not disturbing the meshing of the gear 28 of the roller 22*e* with the rack. The torque motor 70 is carried by a mount 74 secured to the frame 52*e*. The torque motor 70 controls the torque applied to shaft 42*e* of 22*e*, in a pulse modulating mode common to servo control applications.

As applied to the embodiments described thus far, and those which will be described hereinafter, the present invention may be made to be inherently engaged at all times by the placement of additional intermediate clutch rollers 23. In this case, control torque may be applied to control clutch roller 22 and also certain of the intermediate clutch roller 23 to cause the clutch to become disengaged. The control methods of FIGS. 3 and 6 may be readily adapted to operate by this method of clutch control. In the control method as described in FIG. 3, instead of the linkage between auxiliary rail 48 and 20b being arranged to provide a braking or restraining force to the rail 47, the linkage is arranged to provide a clockwise rotation to control roller 22b which causes control roller 22b to move to the right on rail 20b and out of engagement with the clutch roller 23b at the contact point 26b. In similar manner, the control torque motor 70 in FIG. 6 may provide a clockwise control torque to control roller 22e, which, once again, would cause control roller 22e to move to the right on rail 20e and out of engagement with clutch roller 23e at 26e. In like manner, certain of the intermediate clutch rollers 23e may also be provided with disengaging torque if so desired. Therefore, by selecting a number of intermediate clutch roller 23, clutch control may be appplied to cause the clutch to be either selectively engageable, by fewer intermediate clutch roller 23, or selectively disengageable, by more intermediate clutch rollers 23.

Figure 7A:
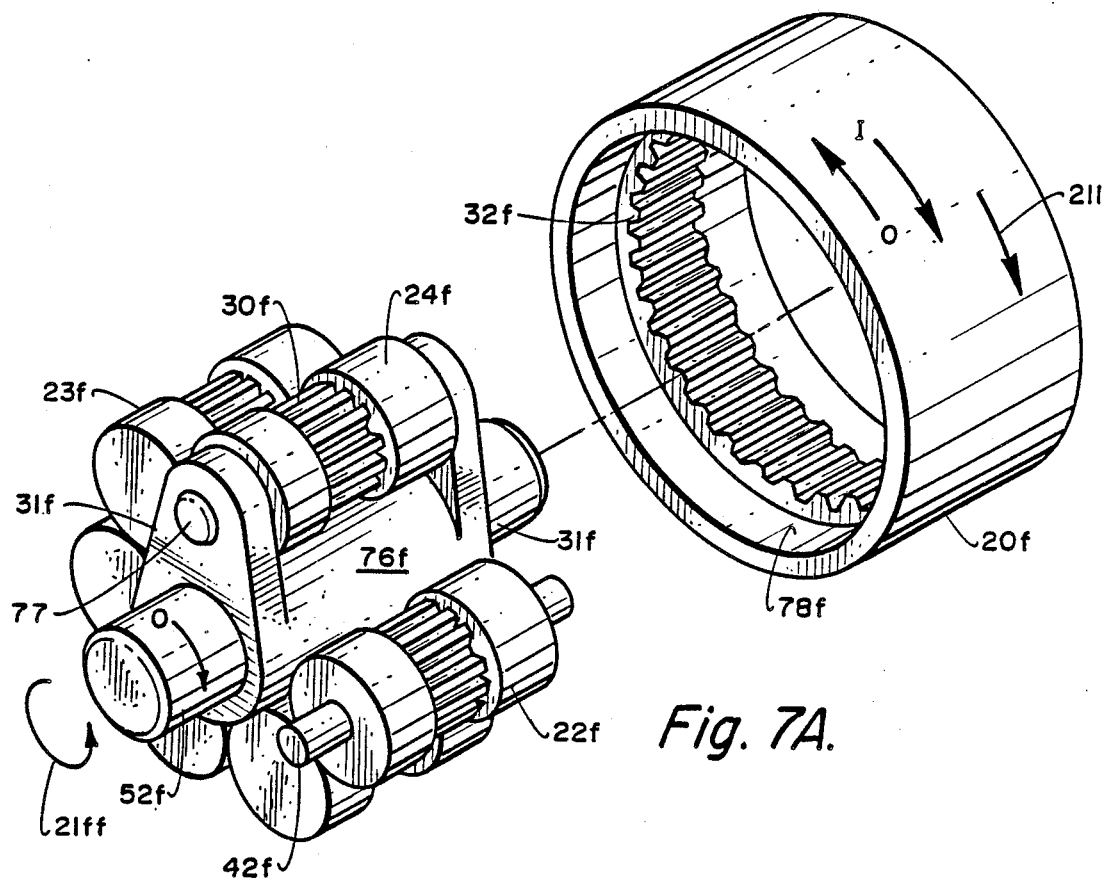
FIG. 7 consists of FIGS. 7A and 7B; the former being an explode isometric view of a rotary embodiment of the present clutch invention.
FIG. 7B being a cross section of the clutch in assembled relation.
Figure 7B:
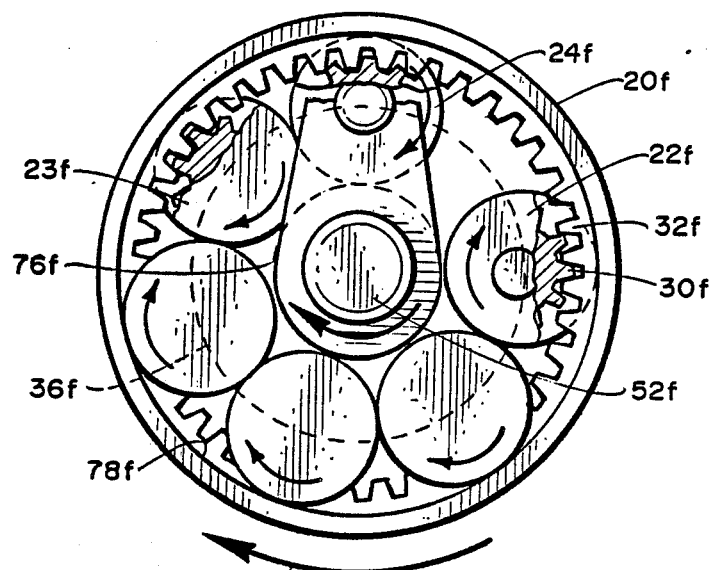

FIG. 7. While the linear embodiments discussed hereinbefore have some practical application, the major utility for the present invention is presently seen to be in rotary embodiments, such as shown in FIG. 7, consisting of 7A and 7B, the former being an exploded isometric view, and the latter a cross section of the assembled clutch. As in the FIG. 4 embodiment, the input is applied through a first member-a rail or rack member, which in this case is in the form of a ring or cylinder 20f having internal rack teeth 32f forming a circular pattern, and a contiguous, internal-facing rail 78f. As seen in FIG. 7A, rack teeth 32f mate with gear teeth 30f on the rollers, thereby coupling 20f and 52f. Mounted concentrically with the rack cylinder 20f is a second or output member in the form of shaft 52f, having an enlarged hub 76f, in turn provided with a pair of spaced radial arms 31f. Extending between and journaled in the arms 31f, by a shaft 77, is a load clutch roller 24f. The roller 24f is the terminal roller of a series of rollers, the axes of which lie on a circular clutch roller line 36f (FIG. 7B). Circularly adjacent and extending along the circular line 36f, away from the load clutch roller 24f, are the intermediate rollers 23f. At the other end of the line 36f is the control clutch roller 22f, mounted on a shaft 42f. The axes of the rollers 22f–24f, as seen in FIG. 7, are transverse of the rail 78f.

In declutched mode, the input rail ring 20f is rotated clockwise, as shown by the arrow 21f. The output shaft 52f remains stationary, because of the inherent load on the shaft; and the rollers 22f–24f are rotated freely as planetary gears by gear coupling to the internal rack 32f. The peripheral surfaces of the rollers engage each other lightly in an oil film, but the frictional traction between them is not enough to cause them to bind or bunch together. To engage the clutch a control force is applied to the control roller 22f, in any one of the forms discussed hereinbefore, for example, by applying a braking force to the shaft 42f of the control clutch roller 22f. The rotative restraint applied to the roller 22f cauess the ring gear or rail 20f to move the roller 22f toward the adjacent roller 23f, and all rollers quickly bunch together along the circular clutch roller line and lock up. This stops all further roller rotation and locks the ring 20f to the shaft 52f. Thereafter 20f and 52f rotates as one body.

As discussed hereinbefore in connection with the linear embodiments of this invention, the embodiment of FIG. 7 may be employed with the shaft 52f as the input and the ring 21f as the output, in which case the direction of rotation is reversed; the shaft 52f is rotated in a counterclockwise direction, as shown by the arrow 21ff.

FIG. 8. An amplified version of the clutch shown in FIG. 7 is shown in FIG. 8, consisting of FIGS. 8A–8F, inclusive.

In this embodiment, the input is applied through the shaft 52g, and output is taken from the shaft 80, which is splined to the cylindrical ring gear 20g. Shaft 52g includes an integral hub portion 76g. The cylinder 20g is mounted coaxially circumjacent the hub 76g. Coupling between 52g and 20g is effected through the planetary clutch rollers 22g, 23g and 24g (FIG. 8C), which occupy the annular space between cylinder 20g and hub 76g.

On the end of the hub 76g is a flange 31g, on the periphery of which are roller bearings 82, which rotatably mount shaft 52g with respect to the cylindrical ring gear 20g. Spaced axially from the flange 31g is an opposed flange in the form of a ring 84, splined to the shaft 52g at 86, and held in place between a snap ring 88 and a shoulder 90 at one end of the hub 76g. At the periphery of the ring 84 are roller bearings 92, which complete the rotative mounting of the cylindrical ring 20g with respect to the shaft 52g (and hub 76g).

Extending axially between the flange 31g and the ring 84 are the clutch rollers 22g, 23g and 24g. The control clutch roller 22g which institutes the bunching of the cascaded rollers is journaled at 94 to a shaft 42g, formed integral with gears 96 and 98. Gear 98 is keyed at 100 to the end of the shaft 42g opposite gear 96. The gear 96 meshes with internal rack teeth 102 formed on the interior of the ring cylinder 20g and the gear 98 meshes with internal rack teeth 104 also formed on the interior of 20g. Adjacent the gears 96 and 98 and mounted on the shaft 42g are roller wheels 106 which roll on the interior surface of bearing rings 78g, mounted on the inner face of the ring cylinder 20g.

The shaft 42g extends through an arcuate slot 108 (FIG. 8D) formed in the ring 84. On the end of the shaft 42g is mounted another gear 110. Adjacent the gear 110 is another roller wheel 112 which rolls around the interior surface of a bearing ring 114 mounted on the interior of a control bell 48g.

The roller 22g is provided with flats or facets 115 (FIG. 8C) around its periphery, forming ridges 116 which parallel the axis of the roller 22g. These ridges include a chattering action on the part of the roller 22g, and which will be explained hereinafter.

The intermediate rollers 23g (FIG. 8C) are like the roller 22g except they do not have the ridges 116, and they are integral with their respective gears 28 (not shown). The rollers 23g have no shaft such as 42g and are simply confined axially between the flange 31g and the ring 84, and radially between cylinder 20g and hub 76g. The rollers 23g are coupled to the cylindrical ring 20g so as to be rotated in planetary fashion by rotation of the shaft 52g with respect to the cylinder 20g. In FIG. 8 this coupling takes the form of the interior rack teeth 102/104 meshing with the teeth 30 (not shown) on the respective gears 28 of the rollers 23g.

As in FIG. 7, the rollers 22g, 23g and 24g are disposed along a circular clutch roller line 36g. At the output end of the circular clutch roller line 36g is the load roller 24g, which is similar to the intermediate rollers 23g, except that the roller 24g and its gears 28g are journaled at 117 about a shaft 77g. The shaft 77g extends through the ring 84, and on its end is journaled a gear 68g. The gear 68g meshes with internal rack teeth 120 formed on the interior of control bell 48g, which is journaled at 122 about the input shaft 52g.

Inwardly, the gear 68g meshes with an idler gear 62g journaled at 124 around the shaft 52g. The gear 110 at the end of shaft 42g also meshes with gear 62g, but it does not mesh with teeth 120 on bell 48g.

The control bell 48g is linked to the cylindrical ring gear 20g so as to rotate therewith, but with limited rotative adjustment. This is done as shown in FIG. 8F by providing the cylinder 20g with an externally projecting arm 128 and providing the control bell 48g with an externally projecting arm 130. Between the two arms is mounted a damper or dash pot 132. The two members 48g and 20g thus rotate together, but with limited rotative adjustment possible—such adjustment being damped by the presence of the damper 132.

The cylindrical ring gear 20g is linked to the output shaft 80 by the keying arrangement shown in FIG. 8F. To this end the output shaft 80 is provided with a flange 134 having radial outward teeth 136, which mesh with teeth 138 on the cylindrical ring gear 20g, and which couple 20g and 80 together rotatively. The two parts are held together by a snap ring 140.

A thrust bearing 142 is provided between the input shaft 52g and the control bell 48g. At the other end a thrust bearing 144 is provided between the flange 134 and the end of the input shaft 52g.

Figure 8A:
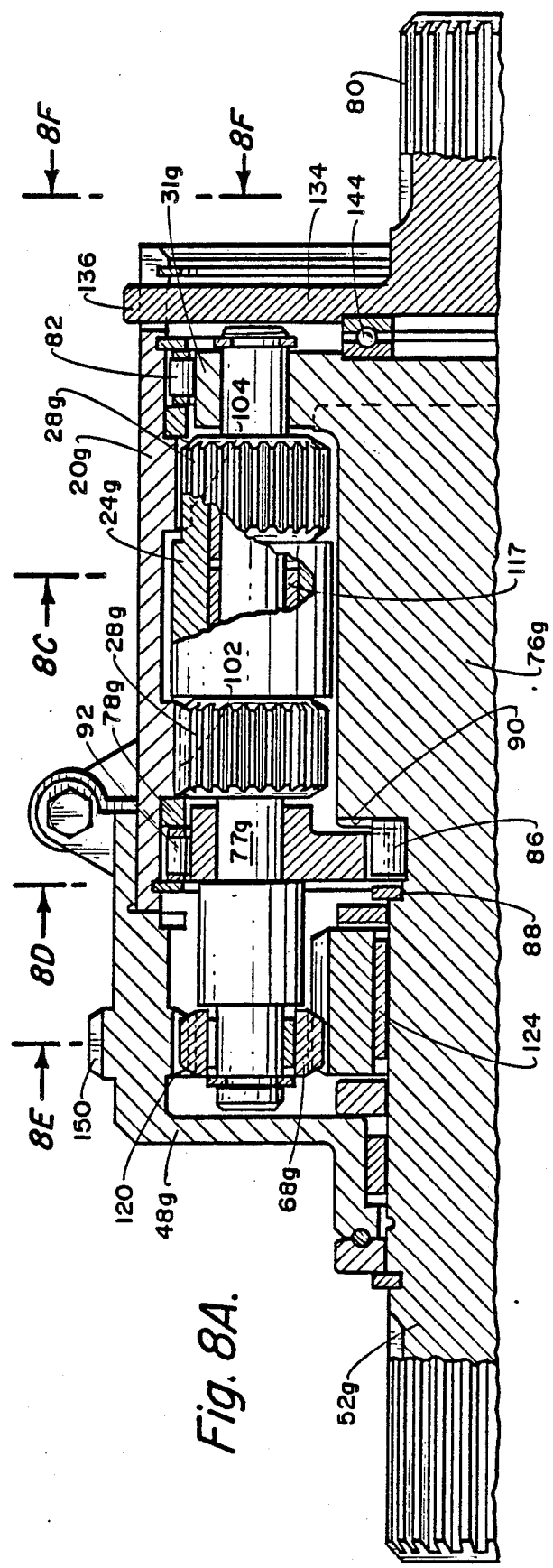
FIG. 8A is a sectional view taken on line 8A—8A in FIG. 8C.
Figure 8B:
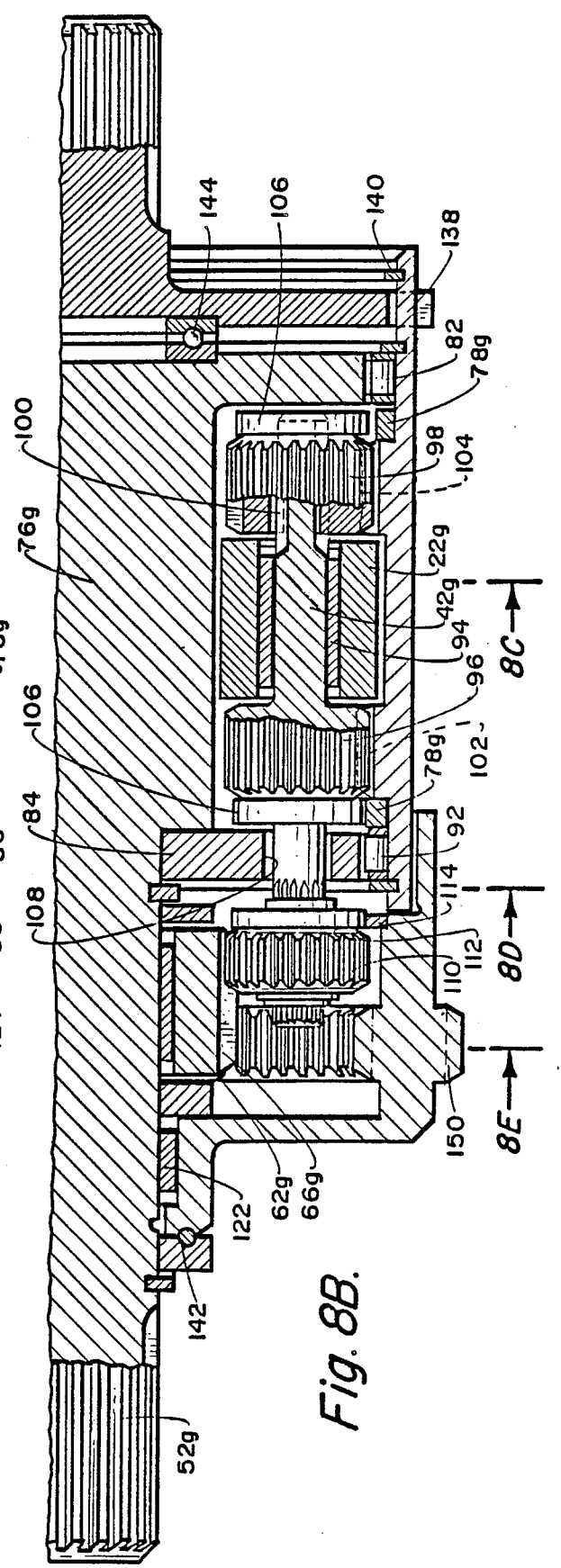
FIG. 8B is a related section view, but taken on line 8B—8B in FIG. 8C.
Figure 8C:
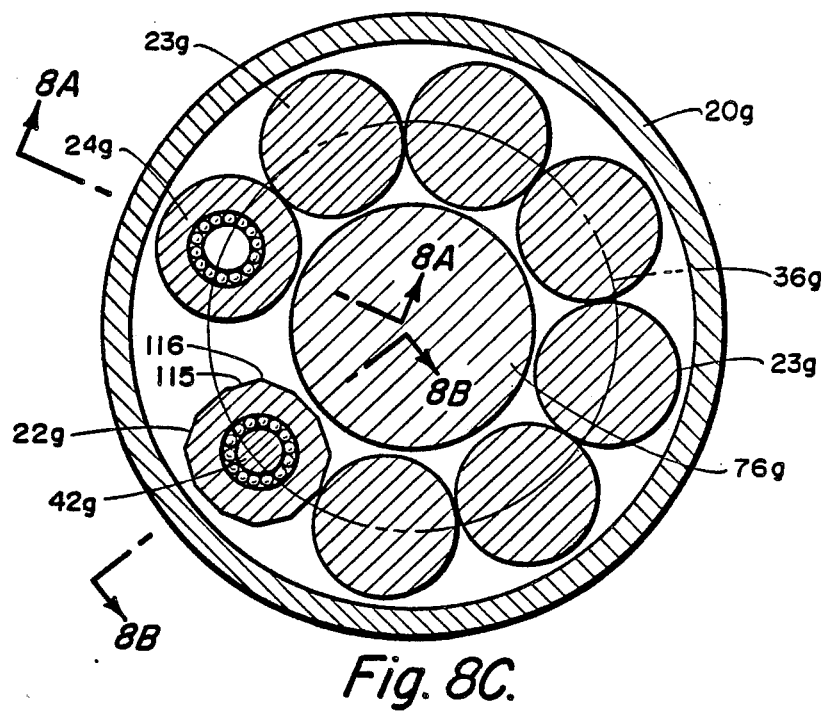
FIG. 8C is a cross section taken on line 8C—8C in FIGS. 8A/8B.
Figure 8D:
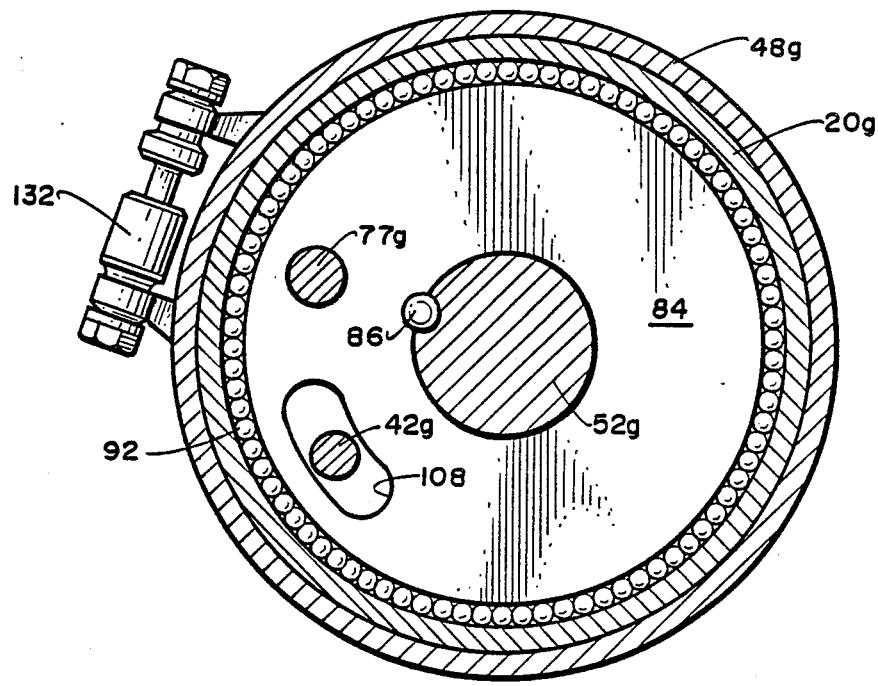
FIG. 8D is a cross section taken on line 8D—8D in FIGS. 8A/8B.
Figure 8E:
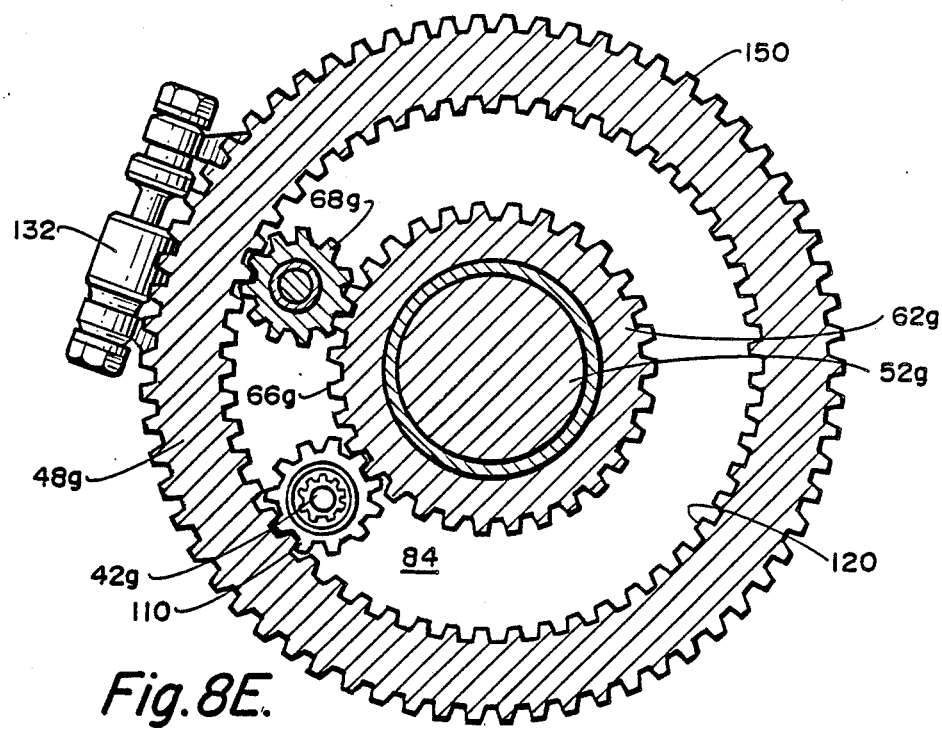
FIG. 8E is a cross section taken on line 8E—8E in FIG. 8A/8B.
Figure 8F:
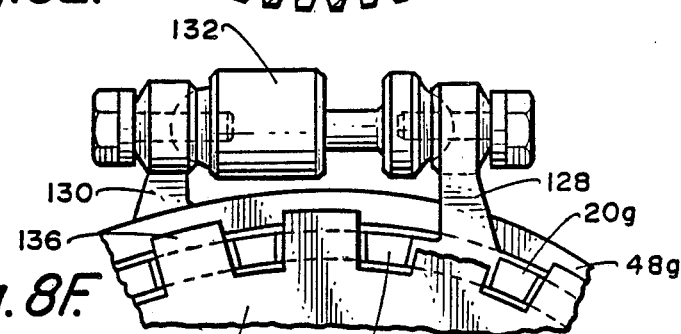
FIG. 8F is a fragmentary view looking along lines 8F—8F in FIG. 8A.

Operation of the clutch shown in FIG. 8 is as follows:

In declutched mode, the input shaft 52g is rotated in a clockwise direction as viewed from the left in FIGS. 8A and 8B. The shafts 42g and 77g translate along the circular clutch roller path 36g around the axis of the input shaft 52g. The meshing of the planetary gears in the teeth 102 and 104 of the cylindrical ring gear 20g, which is stationary (or rotating slower than 52g), causes shaft 42g to rotate in a counterclockwise direction. The meshing at 66g causes the central idler gear 62g to rotate in a clockwise direction.

In declutch mode, the rollers 22g–24g are not bunched together in driving relation. As the input shaft 52g rotates in a clockwise direction, as viewed from the left in FIGS. 8A and 8B, the planetary rollers will be driven around the central shaft 52g by virtue of the force imparted from load roller shaft 77g, pushing the other rollers ahead of it. The tooth engagements at 102 and 104 will cause the respective planetary gears to roll around the internal rack teeth of the output cylindrical ring gear 20g. There will be no significant drive coupling to the output cylindrical ring gear 20g, because the rollers 22g–24g are not bunched together and locked.

In clutch engaged mode, the rollers are caused to bunch and bind frictionally, thus locking the output ring gear 20g to the input shaft 52g. This is done by relative rotation of the control bell 48g with respect to the output ring gear 20g, in the following manner. The control bell 48g is rotated clockwise with respect to the ring gear 20g by the imposition of a suitable drive torque coupled to the external teeth 150 on the bell 48g. This action rotates the gear 68g in a clockwise direction. Through the idler gear 62g, this clockwise rotation is imparted as a clockwise rotation to the gear 110 splined to the shaft 42g. This rotation of the shaft 42g moves the control roller 22g in a counterclockwise direction along the circular clutch roller line 36g and into pulsing contact with the adjacent clutch roller 23g. Because of the flats 115 and ridges 116, the engagement of 22g and 23g is very abrupt. This engagement effects the aforementioned chattering action. As in the previous embodiments, this engagement will quickly cascade around in a counterclockwise direction through all of the clutch rollers 23g and to the load clutch roller 24g. Almost instantly, this action will firmly lock the output ring gear 20g to the input shaft 52g, and the two will turn together as a unit.

To distribute the wear pattern on the clutch rollers, the control roller 22g is provided with flats or facets 115 and ridges 116 therebetween as explained hereinbefore. As the control clutch roller 22g begins to contact the adjacent clutch roller 23, the ridges 116 impart a pulsating control force onto the adjacent clutch roller 23. It will be noted that the control roller 22g rotates freely on its shaft 42g and is not locked into any synchronous position with the gears 96, 98. Thus the wear is random and evenly distributed over the rollers. The damper or dash pot 132 prevents servo oscillation within the natural frequencies of the components.

Figure 9:
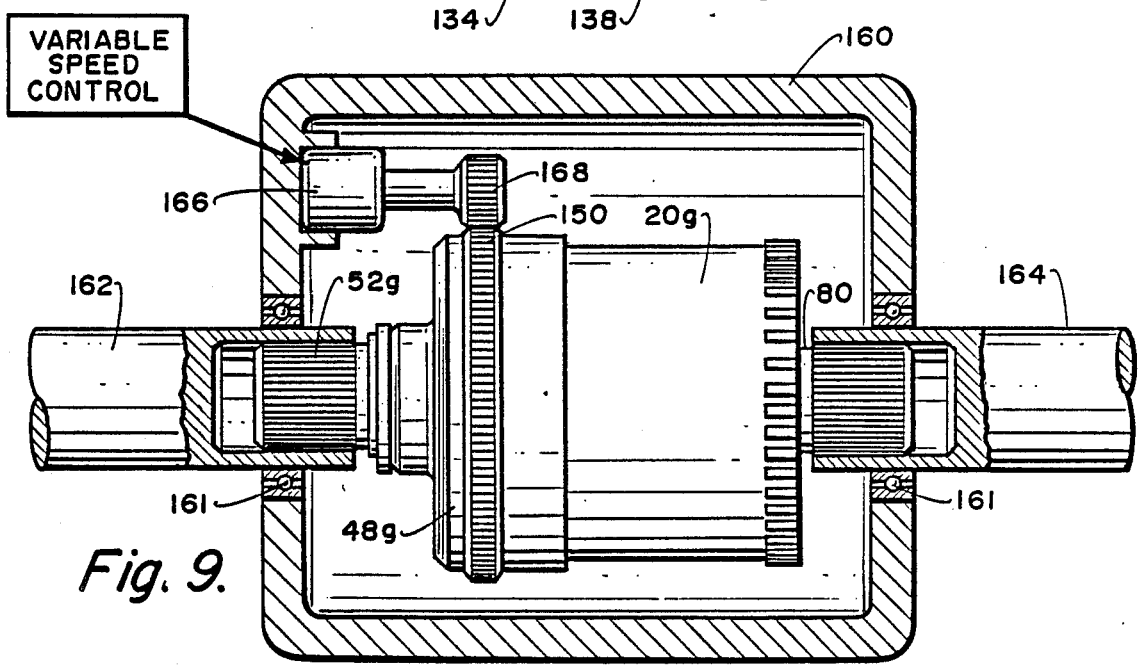
FIG. 9 is a cross sectional view illustrating the clutch of FIG. 8 installed in a frame and including a control servo motor for engaging and disengaging the clutch.

FIG. 9. Control of the bell 48

* * * * *

UNITED STATES PATENT AND TRADEMARK OFFICE
CERTIFICATE OF CORRECTION

PATENT NO. : 4,796,738

DATED : January 10, 1989

INVENTOR(S) : Gregory M. East

It is certified that error appears in the above-identified patent and that said Letters Patent is hereby corrected as shown below:

Columns 11 and 12 should be deleted to appear as per attached columns 11 & 12.
Columns 13 - 24 should be added as per attached columns.

Signed and Sealed this

Second Day of May, 1989

Attest:

DONALD J. QUIGG

*Attesting Officer*

*Commissioner of Patents and Trademarks* the interior of control bell 48g, which is journaled at 122 about the input shaft 52g.

Inwardly, the gear 68g meshes with an idler gear 62g journaled at 124 around the shaft 52g. The gear 110 at the end of shaft 42g also meshes with gear 62g, but it does not mesh with teeth 120 on bell 48g.

The control bell 48g is linked to the cylindrical ring gear 20g so as to rotate therewith, but with limited rotative adjustment. This is done as shown in FIG. 8F by providing the cylinder 20g with an externally projecting arm 128 and providing the control bell 48g with an externally projecting arm 130. Between the two arms is mounted a damper or dash pot 132. The two members 48g and 20g thus rotate together, but with limited rotative adjustment possible—such adjustment being damped by the presence of the damper 132.

The cylindrical ring gear 20g is linked to the output shaft 80 by the keying arrangement shown in FIG. 8F. To this end the output shaft 80 is provided with a flange 134 having radial outward teeth 136, which mesh with teeth 138 on the cylindrical ring gear 20g, and which couple 20g and 80 together rotatively. The two parts are held together by a snap ring 140.

A thrust bearing 142 is provided between the input shaft 52g and the control bell 48g. At the other end a thrust bearing 144 is provided between the flange 134 and the end of the input shaft 52g.

Operation of the clutch shown in FIG. 8 is as follows:

In declutched mode, the input shaft 52g is rotated in a clockwise direction as viewed from the left in FIGS. 8A and 8B. The shafts 42g and 77g translate along the circular clutch roller path 36g around the axis of the input shaft 52g. The meshing of the planetary gears in the teeth 102 and 104 of the cylindrical ring gear 20g, which is stationary (or rotating slower than 52g), causes shaft 42g to rotate in a counterclockwise direction. The meshing at 66g causes the central idler gear 62g to rotate in a clockwise direction.

In declutch mode, the rollers 22g-24g are not bunched together in driving relation. As the input shaft 52g rotates in a clockwise direction, as viewed from the left in FIGS. 8A and 8B, the planetary rollers will be driven around the central shaft 52g by virtue of the force imparted from load roller shaft 77g, pushing the other rollers ahead of it. The tooth engagements at 102 and 104 will cause the respective planetary gears to roll around the internal rack teeth of the output cylindrical ring gear 20g. There will be no significant drive coupling to the output cylindrical ring gear 20g, because the rollers 22g-24g are not bunched together and locked.

In clutch engaged mode, the rollers are caused to bunch and bind frictionally, thus locking the output ring gear 20g to the input shaft 52g. This is done by relative rotation of the control bell 48g with respect to the output ring gear 20g, in the following manner. The control bell 48g is rotated clockwise with respect to the ring gear 20g by the imposition of a suitable drive torque coupled to the external teeth 150 on the bell 48g. This action rotates the gear 68g in a clockwise direction. Through the idler gear 62g, this clockwise rotation is imparted as a clockwise rotation to the gear 110 splined to the shaft 42g. This rotation of the shaft 42g moves the control roller 22g in a counterclockwise direction along the circular clutch roller line 36g and into pulsing contact with the adjacent clutch roller 23g. Because of the flats 115 and ridges 116, the engagement of 22g and 23g is very abrupt. This engagement effects the aforementioned chattering action. As in the previous embodiments, this engagement will quickly cascade around in a counterclockwise direction through all of the clutch rollers 23g and to the load clutch roller 24g. Almost instantly, this action will firmly lock the output ring gear 20g to the input shaft 52g, and the two will turn together as a unit.

To distribute the wear pattern on the clutch rollers, the control roller 22g is provided with flats or facets 115 and ridges 116 therebetween as explained hereinbefore. As the control clutch roller 22g begins to contact the adjacent clutch roller 23, the ridges 116 impart a pulsating control force onto the adjacent clutch roller 23. It will be noted that the control roller 22g rotates freely on its shaft 42g and is not locked into any synchronous position with the gears 96, 98. Thus the wear is random and evenly distributed over the rollers. The damper or dash pot 132 prevents servo oscillation within the natural frequencies of the components.

FIG. 9. Control of the bell 48g may be imposed in a number of ways, one of which is shown in FIG. 9. A stationary frame or housing 160 is shown which has journaled therein, at 161, the clutch forming the subject of this invention. Rotary power is applied through the shaft 162 to the input shaft 52g of the clutch. Output is taken at 164 from the output shaft 80. Mounted interiorly of the housing 160 is a variable speed control motor 166, geared by a pinion 168 to the teeth 150 of the bell 48g. If the motor 166 is driven at such a speed that the bell 48g is caused to constantly keep the control roller 22g pressed into locking engagement with the idler clutch rollers 23g, then the input and the output will be firmly locked together, the clutch will be in engaged mode, and 164 will turn constantly at the same speed as 162. If the speed of motor 166 is less, there will be intermittent engagement between the input shaft 52g and the output ring gear 20g, as the rollers intermittently lock up and unlock. In this way the clutch may expediently serve as a following servo, in which a small amount of power applied to the control motor 166 will cause large power to be put out at the output shaft 164 and at any desired rotative speed, as determined by the speed of the control motor 166.

Figure 10:
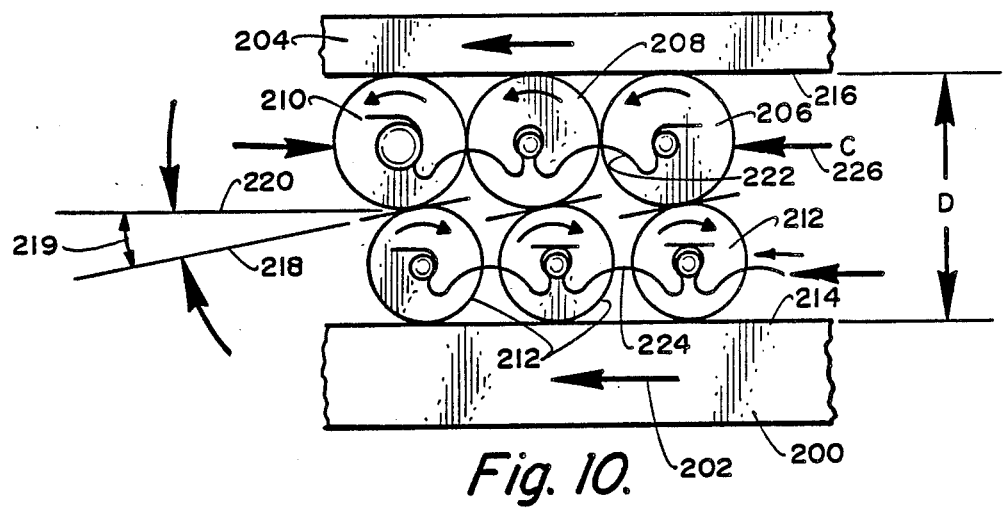
FIG. 10 is a counterpart of FIG. 1, illustrating another form of the invention in which frictional drive replaces gear drive. As in FIG. 1.

FIG. 10. In the embodiments thus far described, the clutch rollers have been coupled to the rail (linear or circular) by tooth engagements in the nature of rack and pinion. The invention may be practiced with frictional couplings in lieu of tooth couplings. Such an embodiment is shown in the schematic representation, FIG. 10. This figure, akin to the foregoing FIG. 1, is to introduce the concepts embodied in this version of the invention. FIG. 10 illustrates a frictional method of engagement or coupling, instead of the tooth engagements heretofore described.

In FIG. 10, 200 represents an input member powered to move from right to left, as shown by the arrow 202. Numeral 204 is a spaced linear member mounted to move parallel with the input member 200. Between the members 200 and 204 are a row of clutch rollers 206, 208, 210, contiguous to the member 204, and a row of traction rollers 212 corresponding in number to the clutch rollers 206–210 and contiguous to the input member 200.

The distance D between the surface 214 of the member 200 and the surface 216 of the member 204 is less than the sum of the diameters of a clutch roller, e.g. 206 and a traction roller 212. The traction rollers 212 contact the surface 214 and an adjacent clutch roller 206–210, and the rollers 206–210 contact the surface 216. By virtue of the dimensioning specified above, a line 218 tangent to the rollers 212 and 210, for example, at their contact point or lines, makes an angle 219 with a line 220 passing through the contact point of the rollers and parallelling the surfaces 214 and 216.

The rollers 212 are smaller than the rollers 206–210, so that, although the rollers 206–210 are in contact with each other, the traction rollers 212 are not in contact with each other. An elongate spring 222 extending from axle to axle of the clutch rollers 206–210 biases the clutch rollers from left to right and tends to resiliently keep them separated. A similar elongate spring 224 extending from axle to axle of the traction rollers 212 biases these rollers from right to left and also tends to resiliently keep them separated. The bias of the spring 224 resiliently urges the traction rollers 212 into contact with the surface 214 and also into contact with the adjacent clutch roller. The resilient bias of the spring 222 resiliently biases the rollers 206–210 into engagement with the surface 216.

With the above structure, when the member 200 is moved from right to left, the traction engagement described above causes the traction rollers 212 to rotate clockwise; the clutch rollers 206–210 to rotate counterclockwise; and the member 204 to move from right to left, but at a rate somewhat greater than the travel rate of 202, because of the differential in diameter between the traction rollers and the clutch rollers. The rollers 206 and 212 do not move linearly. In this action, while the clutch rollers 206–210 are lightly in engagement with each other at their respective contact points (or lines) and the peripherial surfaces are moving in the opposite direction, there is no binding, because the force between the rollers is not sufficient to lock them up. As in the case of the embodiments described hereinbefore, these rollers operate preferably in an oil bath.

When a control force C is applied to the control clutch roller 206 from right to left, as shown by the arrow 226, the jamming action between rollers 206 and 208 causes the rollers to lock up and stop turning. This jamming or bunching action is transmitted rapidly from right to left and jams all of the clutch rollers 206–210. Simultaneously, the traction rollers 212 are jammed against rotation and a wedging action takes place because of the angle 219 between the lines 218 and 220. Under this condition, all of the rollers are locked to the member 200 and move with it as a unit from right to left as does the member 204.

With relief of the control force C, the bunching action disappears, and the rollers are no longer jammed together and resume their rotation in the declutch mode, without linear movement.

By virtue of the wedge angle 219, the greater the load on the system, the tighter will be binding or jamming action of the rollers to the members 200 and 204. In the free running state or declutched mode, the tractional engagement between the clutch rollers 206–210 and the traction rollers 212 is greater than the traction between and among the clutch rollers themselves.

Figure 11:
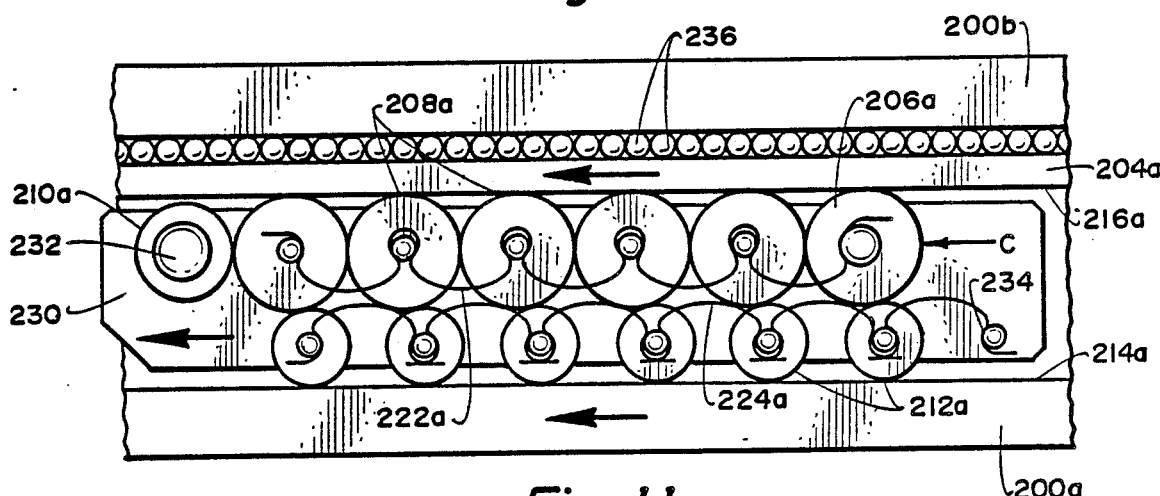
FIG. 11 is an expansion of FIG. 10 showing a modification thereof.

FIG. 11. An amplification of the conceptual structure shown in FIG. 10 is shown in FIG. 11, wherein corresponding parts carry the same reference number followed by an alphabetic postscript.

In FIG. 11, the clutch rollers and the traction rollers are shown as being associated with and carried by an output member 230. The end roller 210a in FIG.11 is journaled on an axle 232 carried by the output member 230. The intermediate rollers 208a are not journaled on axles mounted on the output member 230 but are simply captured between the surface 216a and the adjacent tangential surface of the corresponding traction roller 212a. As in the FIG. 10 embodiment, the elongate spring 222a tends to keep the clutch rollers 208a resiliently separated and the elongate spring 224a, having one end anchored to the output member 230 at 234, tends to keep the traction rollers biased into tangential contact with the corresponding clutch rollers 208a.

The input member consists of a lower portion 200a and an upper portion 200b. The intermediate member 204a parallels the member 200b and is permitted to move from left to right or right to left at a different rate than the member 200a/200b by virtue of bearings 236 between the member 204a and the member 200b.

The operation of FIG. 11 is substantially the same as FIG. 10. In declutched mode the input member 200a/200b moves from right to left. The output member 230 is essentially stationary or moving at a slower rate. The traction rollers 212a are caused to rotate in a clockwise direction; the clutch rollers 206a, 208a are caused to rotate in a counterclockwise direction, and the member 204a is moved from right to left at a rate somewhat greater than the right to left movement of 200a–200b. There is substantially no load or force transmitted between the input and output members. When the control force C is applied from right to left, the jamming or bunching action is instituted and rapidly cascades from right to left, locking all of the rollers 206a, 208a and 210a against any further rotation and the traction rollers 212a are also locked against rotation. This now locks the output member 230 to the input member 200a–200b and the members move in unison from right to left.

Figure 12:
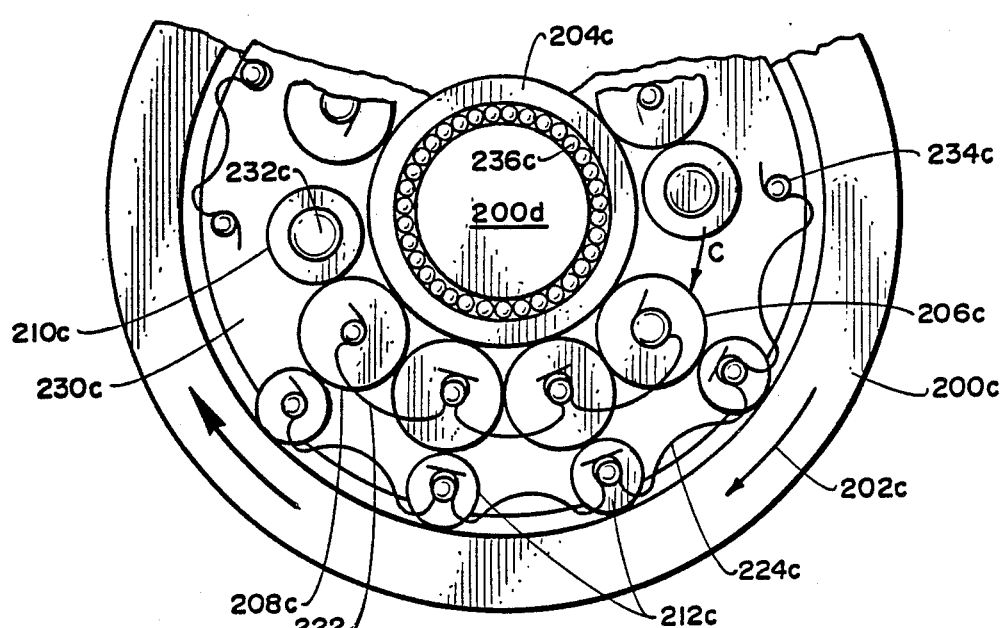
FIG. 12 is a cross sectional view of a rotary version of the clutch illustrated in FIG. 11.

FIG. 12. In FIG. 12 a rotary application of the structure shown in FIG. 11 is illustrated. As before, corresponding reference numerals have been applied to corresponding parts with a postscript. The structure of FIG. 12 is very similar to FIG. 11 except that the linear parts and dimensions have been made into circles.

In operation, the input members 200c/200d are rotated clockwise, as shown by the arrow 202c. In declutched mode, this rotation causes the traction rollers 212c to rotate clockwise, and causes the clutch rollers 206c to rotate counterclockwise. This motion is further translated to clockwise rotation of the ring 204c held in rotative relationship to the shaft 200d by the bearings 236c.

As in FIG. 11, when a control force is applied at C in a clockwise direction, the control clutch roller 206c jams or bunches against the adjacent clutch roller 208c, and all rollers rapidly lock up to lock the input member 200c/200d to the output member 230c, which carries the rollers; and the entire assembly rotates as a unit.

The control C may be applied to the rollers 206c by any desired mechanism, as for example that shown in FIG. 8 as applied to the control roller 22g.

Figure 13:
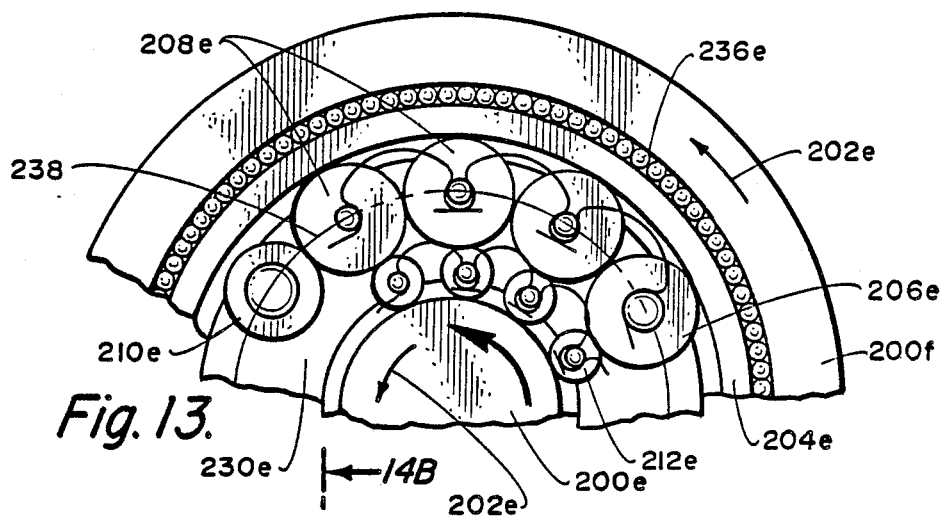
FIG. 13 illustrates a modification of the embodiment shown in FIG. 12.

FIG. 13. The embodiment shown in FIG. 13 is the same as FIG. 12 except that the circle or ring 238 of clutch rollers 208e is now outside rather than inside the circle or ring of the traction rollers 206e. In this case, the input applied through the input member 200e is in a counterclockwise direction as shown by the arrow 202e.

Figures 14A, 14B:
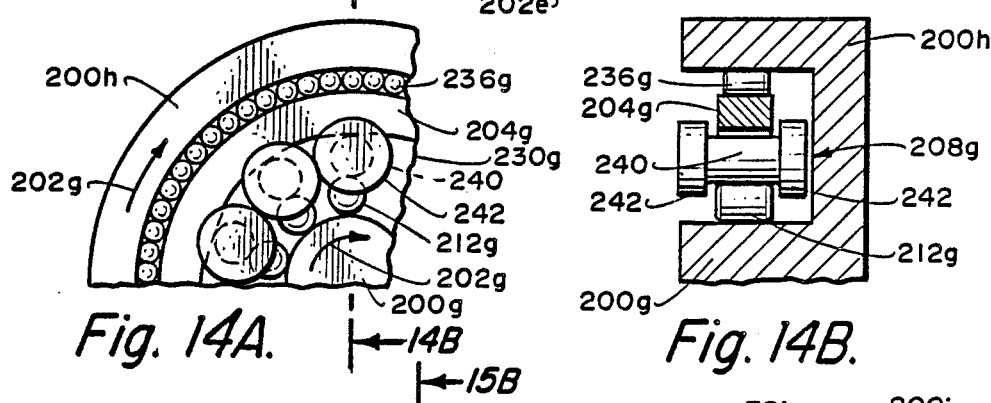
FIG. 14A, is a fragmentary cross section.
FIG. 14B is a fragmentary section taken on line 14B/14B in FIG. 14A.

FIG. 14. In the embodiments shown in FIGS. 12 and 13, for example FIG. 13, the cylindrical surface of the cascaded clutch rollers 208e serves as the contact surface for binding the rollers together and also as the traction surface engaged by the traction rollers 206e. In the modification shown in FIG. 14, consisting of FIGS. 14A and 14B, the rollers 208e of FIG. 13 are made with two different diameters, as shown at 208g in FIG. 14B. The roller 208g has a central portion 240, which engages the traction roller 212g, spanned by a pair of larger diameter sections 242 which constitute the frictionally engageable jamming portions of the clutch rollers.

As in FIG. 13, the input member consists of the shaft 200g and an outer ring 200h. When the input member 200g/200h is rotated clockwise, as shown by the arrow 202g, the traction rollers 212g and 240, which are nested between the surface of the shaft 200g and the inner surface of the ring 204g cause the ring 204g to rotate. This rotation is guided by the bearings 236g, interposed between the ring 204g and the portion 200h of the input member.

When the rollers 208g are caused to jam by the imposition of the control force alluded to hereinbefore, the adjacent counter rotating surfaces of the roller portions 242 jam against each other, ceasing all roller rotation, and locking the output member 230g to the input member 200g/200h. The entire assembly then rotates in unison.

Figures 15A, 15B:
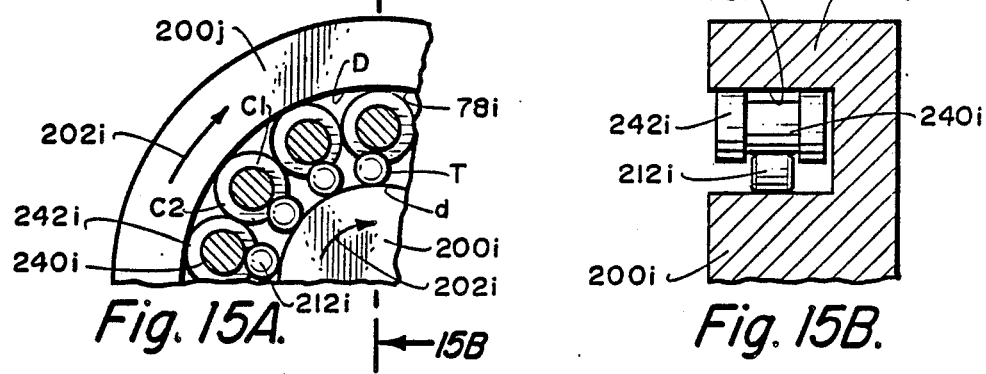
FIG. 15A is a fragmentary cross section of the clutch.
FIG. 15B is a cross sectional view looking in the direction of the arrows 15B/15B in FIG. 15A.

FIG. 15. The intermediate idling ring 204g of FIG. 14 may be eliminated by appropriate choice of roller diameters. This is shown in FIG. 15, consisting of FIGS. 15A and 15B. In this figure, the cascaded clutch rollers bear directly upon and are guided by the interior circular surface 78i of the outer portion 200j of the input member 200i/200j. In this embodiment, the ratio of the diameter of 78i to the diameter of the shaft 200i is made the same as the ratio of the diameter of the clutch roller 242i to the diameter of the interior portion 240i that is in traction engagement with the traction roller 212i. With this dimensioning, the rollers 242i will roll without slippage on the interior surface 78i of the outer portion 200j of the drive member. As in FIG. 14, the input is in a clockwise direction, as shown by the arrow 202i.

Figures 16A, 16B:
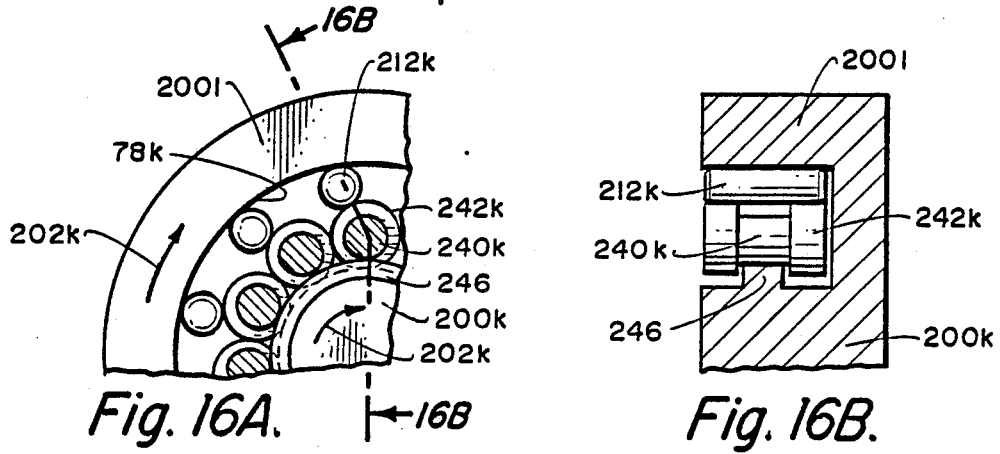
FIG. 16 consists of FIGS. 16A and 16B, which are in general counterparts of FIGS. 15A and 15B, showing a still further modification or embodiment.

FIG. 16. In like manner, the idler ring 204c of FIG. 12 may be eliminated by approriately dimensioning the rollers as shown in FIG. 16 consisting of FIGS. 16a and 16b. The structure of FIG. 16 is similar to that of FIG. 12, except that the idling ring 204c between the shaft 200d and the cascaded clutch rollers 206c has been eliminated. In FIG. 16, the cascaded clutch rollers 242k are kept in position by virtue of the reduced diameter portion 240k which is captured and rolls directly on the surface of a projecting rail 246 formed on the shaft portion 200k of the input member as shown in FIG. 16b.

As in the case of FIG. 15, this structure calls for the ratio of the diameter at 78k to the diameter of the projecting rail portion 246 to be the same as the ratio between the diameter of 242k and the diameter of 240k.

Figure 17:
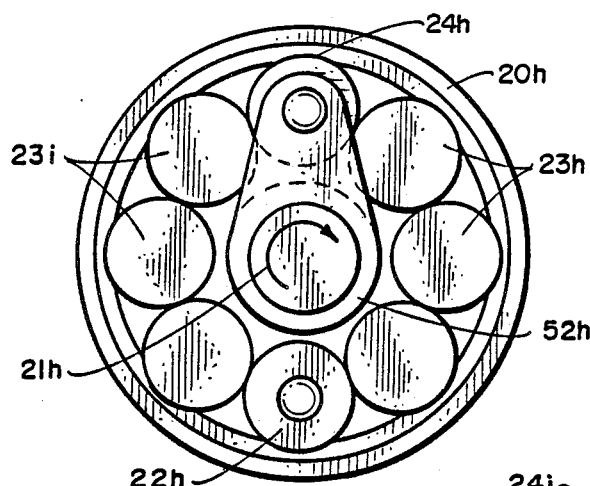
FIG. 17 is a cross sectional view illustrating another embodiment of this invention.

FIG. 17. In the embodiments heretofore described, the input (and output) must be unidirectional, that is, in a given direction, either linear or rotative. The various embodiments of this invention may be readily adapted to bi-directional input. That is, the input (and hence the output) may be in either direction, linear or rotative. This technique makes it practical to "drag" an engine for braking, as well as drive the wheels of a vehicle.

By way of example, an adaptation of FIG. 7 is shown in FIG. 17, where appropriate numerical references are the same as in FIG. 7, but distinguished by a different alphabetic postscript. In FIG. 17, the control roller 22h, instead of being placed at the end of the cascaded clutch roller line, is placed intermediate between two sets of idling clutch rollers 23h and 23i. In this way, rotation may be in either direction, as indicated by the arrowed line 21h.

If input is to be applied through the ring gear or rack 20h, and this circular rack is rotated in a clockwise direction, all of the clutch rollers will idle in the declutched mode as in the various embodiments described hereinbefore. When a control force is applied to the control roller 22h, as for example, by a braking action on the shaft of 22h, the roller 22h will be moved by the rack 20h in a clockwise direction. This will bunch together or jam the intermediate idler rollers 23i, which will lock against the load roller 24h and will lock the input rack 20h to the shaft 52h serving as an output, and the entire assembly will move in unison in a clockwise direction.

Similarly, if the input at 20h is rotated counterclockwise, a locking action on the control roller 22h will bunch or jam the other idler clutch rollers 23h, and a similar locking action will occur in a counterclockwise direction.

As in all of the embodiments heretofore described, the input may be applied to the shaft 52h and the output taken from 20h. In the case of FIG. 17, this input may be in either direction.

In FIG. 17, both cascades 23h and 23i employ a common control roller 22h and a common load roller 24h. If desired, separate control and/or load rollers may be introduced for each of the two cascades.

Figure 18A:
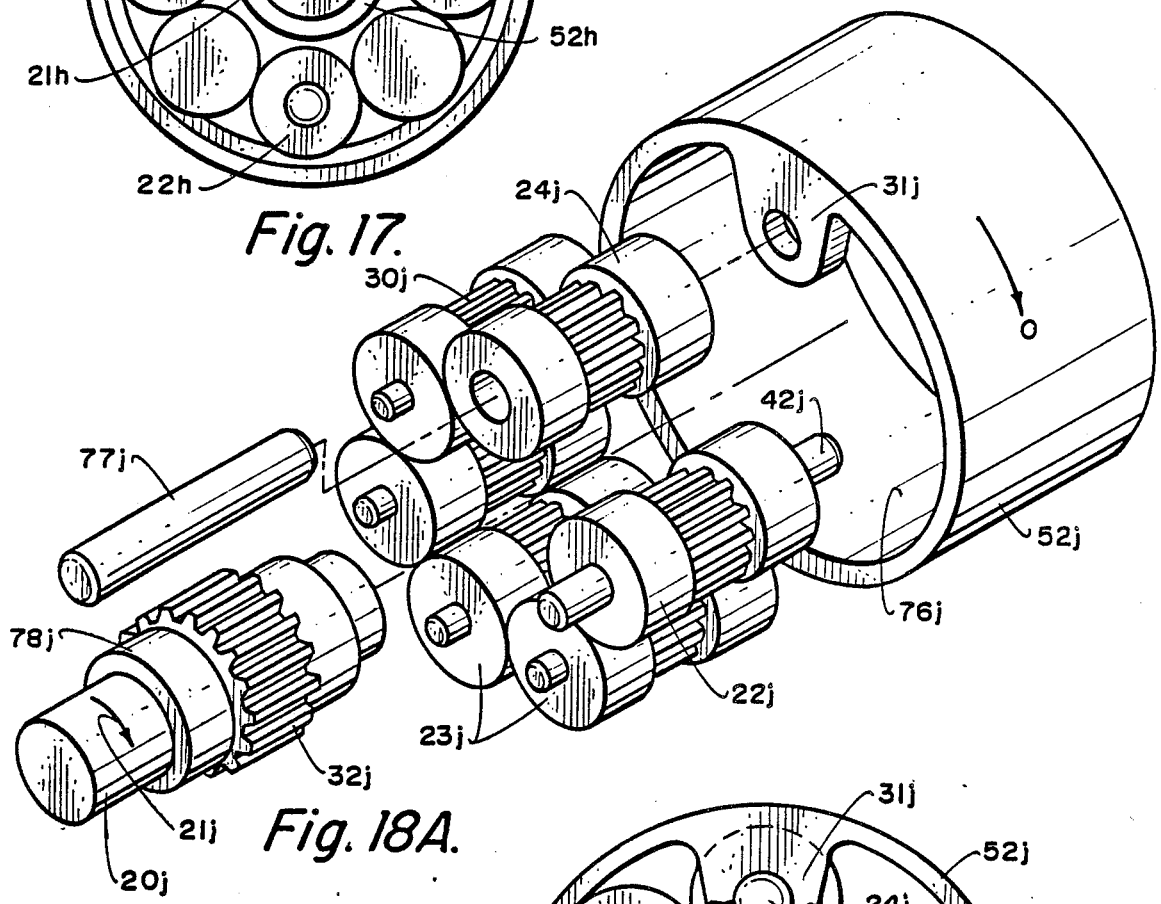
FIG. 18 consists of FIGS. 18A and 18B, which are patterned along the format of FIG. 7. It illustrates a different method of applying input power or force to the rotary clutch.
Figure 18B:
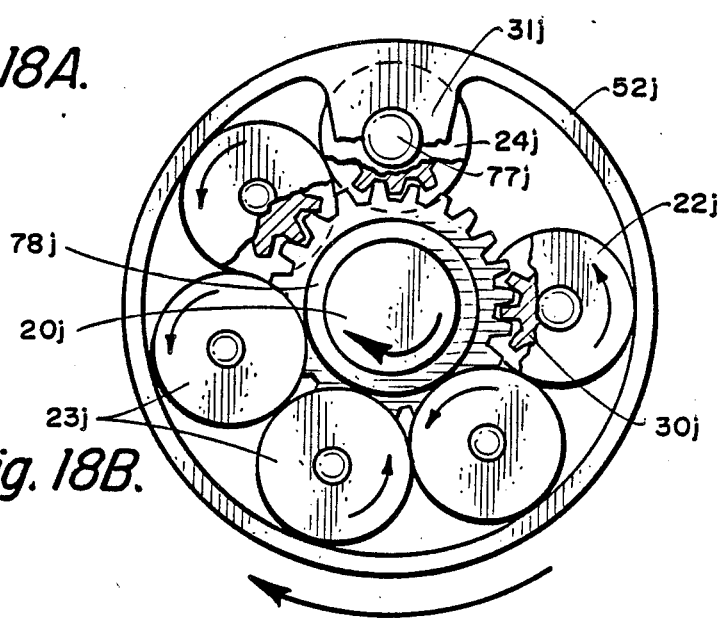

FIG. 18. In FIG. 7, the clutch rollers form a part of the central rotating member or shaft 52f and are coupled, as by the gear teeth at 30f and 32f, to the external cylindrical or ring member 10f. A reversal of this arrangement is shown in FIG. 18, consisting of FIGS. 18A and 18B. As before, corresponding parts carry the same reference numeral distinguished by an alphabetic postscript.

In FIG. 18, the member corresponding to the rack teeth 32 of the previous embodiments is in the form of gear teeth 32j on input shaft 20j, which mesh with the several planetary gears 30j of the clutch rollers 22j, 23j and 24j. The rollers 22j and 23j are confined in a circumferential pattern by the juxtaposition of the several rollers in the cascade. The load roller 24j is journaled on a shaft 77j mounted in the arms 31 of the output ring or cylindrical member 52j.

In operation, input power is applied, as shown at 21j, to the shaft 20j. If there is no control force on the control roller 22j, the planetary gears rotate freely by virtue of the meshing at 30j/32j. No significant torque is applied to the output ring or cylinder 52j.

Control force may be applied to the control roller 22j, as for example, by applying a brake to its shaft 42j. The gear meshing at 32j/30j jams the roller 22j against the adjacent roller 23j and this action quickly cascades around to the end or load roller 24j. All rollers bind against further rotation locking themselves to the input shaft 20j; and torque from 20j is then applied to the output ring 52j by virtue of the mounting of the load roller 24j on the shaft 77j.

Figure 19:
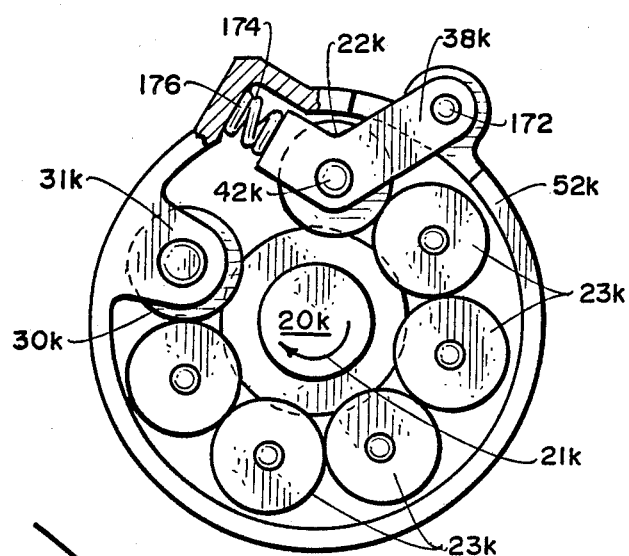
FIG. 19 is a somewhat schematic view illustrating a particular method of loading the clutch, i.e., causing it to engage, and allows it to disengage.

FIG. 19. The present invention may be employed in the form of a one way or overrunning clutch. As applied to the embodiment of FIG. 18, this appears in FIG. 19, where the components are the same as shown in FIG. 18, with the addition of an angular arm 38k, pivoted at 172 to the cylindrical output member 52k. At the bend in the arm 38k is journaled the shaft 42k of the control roller 22k. The roller 22k is biased toward the adjacent idler clutch roller 23k by a compression spring 174 compressed between the interior of a wall 176, formed in the cylindrical output member 52k, and the end of the angular arm 38k.

When the input shaft 20k is rotated in a clockwise direction as shown by the arrow 21k, the roller cascade is bunched or jammed together by the spring 174. This locks the input 20k to the output 52k, and the entire assembly is in clutched mode and rotates in unison. When the input shaft 20k is rotated in the counterclockwise direction, the jamming is relieved and there is no significant coupling between 20k and 52k.

FIG. 20. FIG. 20 shows a modification of FIG. 19 in which the loading imposed by the spring 174 of FIG. 19 may be selectively removed, thereby making the clutch a selective one way clutch. In FIG. 20, the arm 381 is extended outwardly to provide a lever portion 178. Pivoting of the arm 381 clockwise by pressure on the lever arm 178 overcomes the bias of the spring 1741, relieving the pressure of the control roller 221 on the adjacent clutch roller 231. Under this condition, the clutch is in declutched mode in both directions of rotation. When the pressure on 178 is relieved, the clutch again becomes a one way or overrunning clutch.

Figure 21:
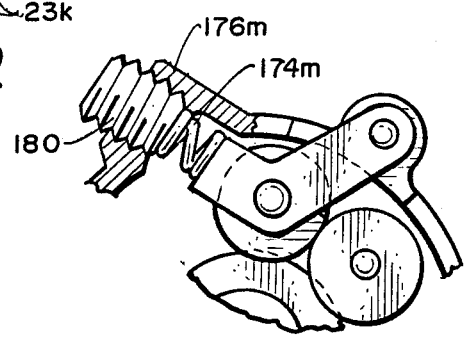
FIG. 21 is a fragmentary view illustrating another modification of the structure shown generally in FIG. 19.

FIG. 21. If desired, the force of the spring 174 in FIG. 19 may be adjusted, by the structure shown in FIG. 21. Here the back-up of the spring 174m, instead of being directly on the wall 176m, is achieved by a set screw 180, adjustably threaded through the wall 176.

Figure 22:
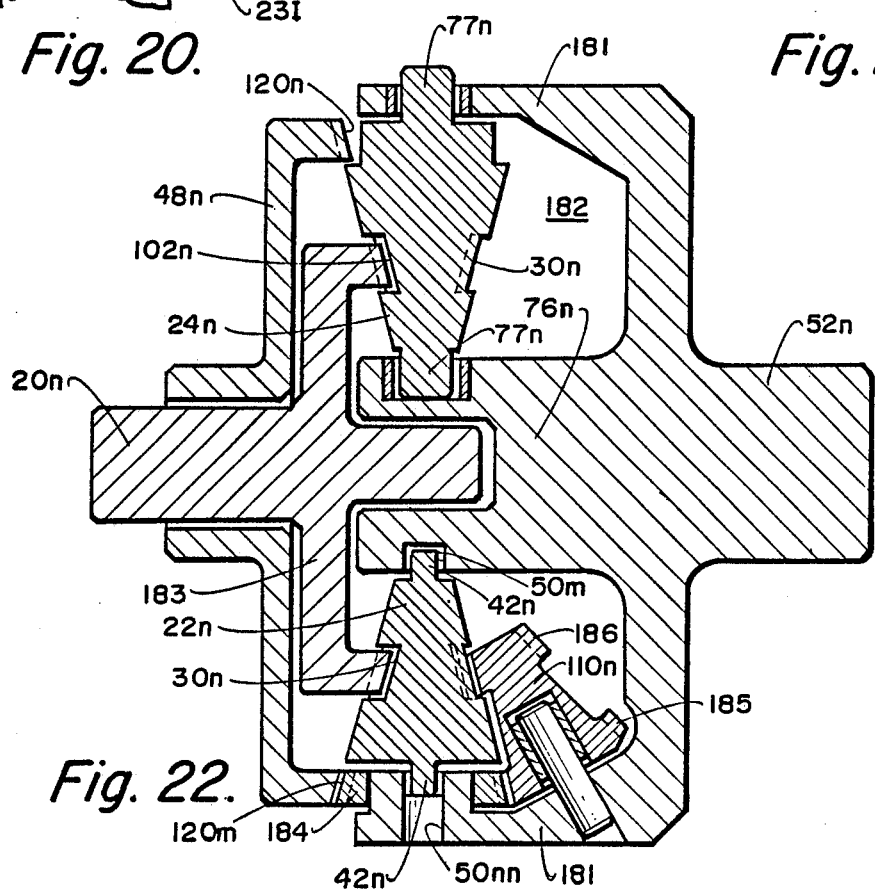
FIG. 22 shows an application of this invention where the clutch members, instead of being cylindrical, are configured as cones.

FIG. 22. The clutch rollers need not be cylindrical. They may assume a different form of a circular solid of revolution. In FIG. 22 is shown an embodiment of the invention wherein the rollers are conical. In this figure, the input member 52n is formed integral with a bell having a hub 76n and a perpherial flange 181, leaving therebetween a toroidal annulus 182. In the annulus 182 are mounted radially the conical clutch rollers. Shown in the figure are the control clutch roller 22n and the load clutch roller 24n. it being understood that the intermediate clutch rollers 23, which are not shown, occupy substantially the remaining portion of the toroidal space. Although FIG. 22 is shown as a planar section, it should be understood that the conical rollers occupy substantially the entire toroidal space 182 generally in the manner that the rollers occupy the annular space in FIG. 8C.

The control roller 22n is journaled, by stub shaft extensions 42n, in the hub 76n and cylindrical flange 181, respectively. This journaling employs slots or grooves 50n, the functional counterpart of the slot 50 in FIG. 4A and the slot 50d in FIG. 5B. On the radial inward end of the conical rollers, each stub shaft 42n is held in a circumferential grove 50n. On the radial outward end of the rollers, each shaft 42n is held in one of a series of slots 50nn formed circumferentially around the flange 181. Circumjacent the conical face of each clutch roller, e.g., roller 22n, are gear teeth 30n. These teeth mesh with teeth 102m formed on the periphery of a flange 183 constituting a portion of the output shaft 20n.

As in the cylindrical embodiment shown in FIG. 7A, the load roller 24n is journaled by its stub shaft 77n in appropriate bearings in the hub 76n and flange 181, respectively.

In declutched mode, rotation of the input shaft 52n, with the output shaft 20n being substantially stationary, causes the clutch rollers to rotate about their respective axis by virtue of the tooth engagement at 102m/30n. If the control roller 22n is moved by a control force toward its adjacent idling clutch roller 23 (not shown), the adjacent conical surfaces of the cascade of conical rollers bind frictionally, as in the case of the FIG. 7 embodiment, and the rollers are not longer free to rotate. This binds the input 52n to the output 20n, and the mechanism is in clutched mode, the parts now turning in unison.

Control is imposed upon the clutch in a manner somewhat similar to that shown in FIG. 8. Journaled circumjacent the output shaft 20n is a disc-like member 48n, having at its periphery a ring of conically disposed teeth 120n which engage the teeth of a conical gear 184, journaled to the flange 181 circumjacent the shaft 42n of the control roller 22n. Opposite the engagement at 120n, the gear 184 is meshed with a conical gear 110n journaled at an angle in the flange 181. Teeth 185 on the gear 110n mesh with the gear 184, while teeth 186 on the gear 110n mesh with the teeth 30n on the control clutch roller 22n.

The disc 48n rotates with the output shaft 20n, but may be selectively moved with respect thereto about the axes of the members. This adjustment corresponds to the adjustment of the bell 48g with respect to the cylinder ring 20g of FIG. 8. As in FIG. 8, when the disc 48n in FIG. 22 is rotated slightly with respect to the shaft 20n, the control roller 22n is forced into engagement with the adjacent clutch roller 23, and the rollers bunch together and bind, to put the clutch in engaged mode. Thus, as in FIG. 8, as long as the control drive for 48n is rotating at a speed (with respect to 20n) sufficient to keep the control roller 22n in binding engagement with the other clutch rollers 23, the clutch will be in engaged mode. If the rotative speed imparted to 48n is less than that of 20n the clutch will be in declutched mode, either constant or intermittent.

In FIG. 22, the shafts of the conic rollers 22n, 23n (not shown) and 24n in effect lie on the surface of a planar circle centered on the axis 20n/52n. This configuration is a special case of a conic arrangement, where the roller shafts could reside on the surface of a cone having its axis at 20n/52n. As noted, FIG. 22 is a specific case of such an arrangement, where the semi vertical angle of the cone is 90 degrees, i.e. a planar circle.

Figure 23A:
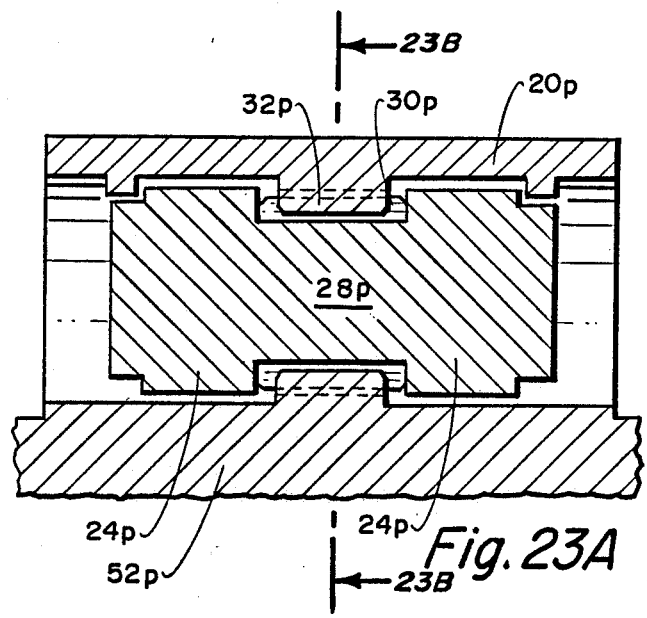
FIG. 23A is a longitudinal fragmentary section.
Figure 23B:
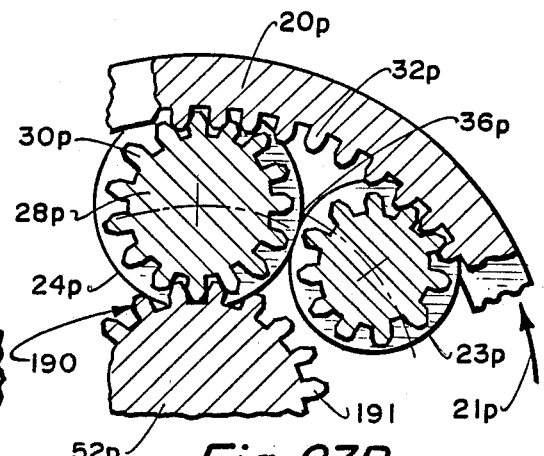
FIG. 23B is a cross section taken on line 23B—23B in FIG. 32A.

FIG. 23. In FIG. 7 the load clutch roller 24f transmits the torque from the ring 20f serving as an input, to the shaft 52f, serving as an output, through the shaft or axle 77 by which the roller 24f is journaled in the hub 76. Another way of coupling the load clutch roller 24 to the output is shown in FIG. 23, consisting of FIGS. 23A and 23B. In FIG. 23B the load clutch roller 24p is shown, with the other rollers 23p and 22p (not shown) 23p extending in a clockwise direction away from the load clutch roller 24p; whereas in FIG. 7 the other clutch rollers 23f extend in a counterclockwise direction away from the load clutch roller 24f. Thus, in FIG. 23b the input cylinder or ring 20p would be rotating in a counterclockwise direction as shown by the arrow 21p, rather than the clockwise direction of FIG. 7.

In FIG. 23, the load clutch roller 24p has a gear portion 28p which is engaged with the output shaft 52p by a tooth engagement shown at 190. The load clutch roller (FIG. 23A) comprises a pair of spaced rollers 24p which are of larger diameter than the remaining rollers 23p in the cascade. By this differential in size, the teeth 30p of the gear 28p of the load clutch roller 24p can be configured to engage both the teeth 32p of the input cylinder or rail 20p, and the teeth 191 of the output shaft 52p. At the same time, the other rollers 23p, being of smaller size, may be configured so as to be engaged only by the rack teeth 32p of cylinder 20p, and be completely clear of the teeth 191 on the output shaft 52p.

The operation of FIG. 23 is substantially the same as described for FIG. 7, except that rotation is shown as counterclockwise; also, when the rollers are bunched into engagement by actuation of the control clutch roller 22, the load, when imposed on the load clutch roller 24, transmits to the output 52 through the tooth engagement at 190, rather than through the axle or shaft 77 of FIG. 7.

Figure 24A:
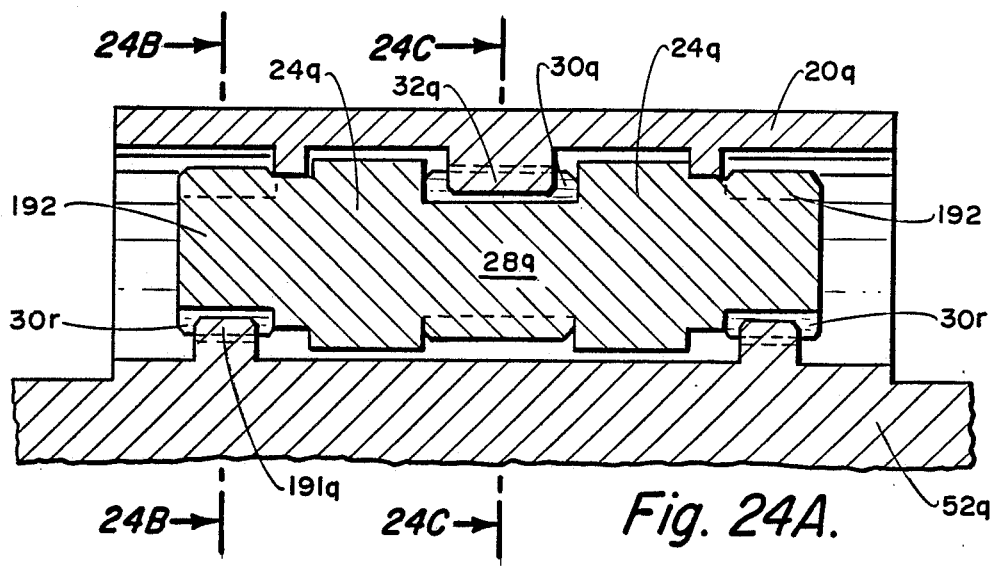
FIG. 24A is a fragmentary longitudinal section.
Figure 24B:
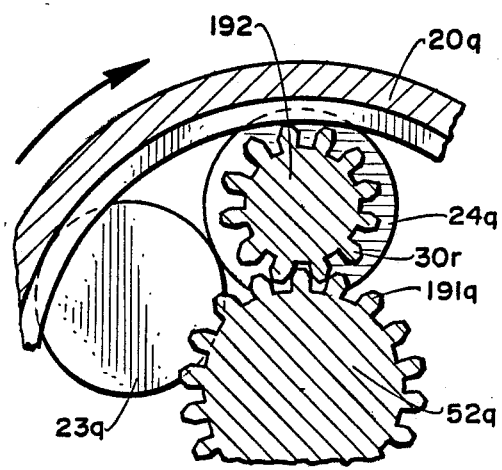
FIG. 24B is a cross section taken on lines 24B—24B in FIG. 24A.
Figure 24C:
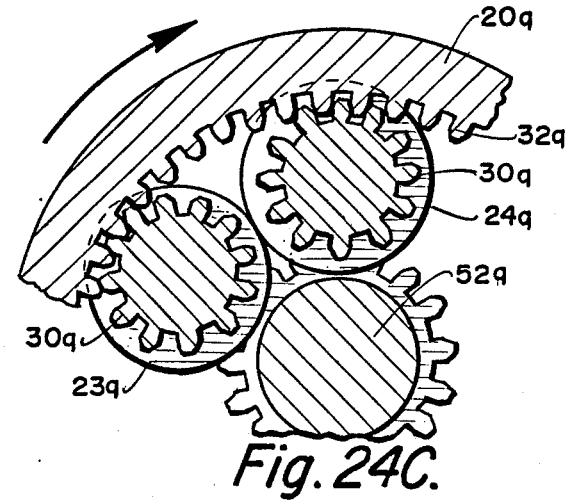
FIG. 24C is a cross section taken on line 24C—24C in FIG. 24A.

FIG. 24. This same alternative method of transmitting the load from the load clutch roller 24 to the output 52 may be done, if desired, without enlarging the load clutch roller. This is shown in FIG. 24, consisting of FIG. 24A, 24B, and 24C. Here the load clutch roller consists of a pair of spaced rollers 24q, between which is the gear portion 28q having teeth 30q which engage internal rack teeth 32q on the input cylinder or rail 20q, substantially in the same manner as the gear portion 28p in FIG. 23 engages the internal teeth 32p.

The difference between FIG. 24 and FIG. 23 is that, radially inward of the teeth 32q, the gear 28q, unlike the gear 28p, does not engage the output shaft 52q. Instead, for symmetry, a pair of additional gears 192 are provided at each end of the roller assembly comprising the rollers 24q, and it is the teeth 30r on these gears 192 that engage the teeth 191q of shaft 52q. By the provision of these separate gears 192, the diameter of the load clutch roller 24q may be made the same as that of the remaining rollers 23.

Clutching and declutching of the embodiment shown in FIG. 24 is the same as FIG. 23, the only difference being the manner in which the load clutch roller 24 is geared to the output shaft 52. Also, rotation in FIG. 24B and C is clockwise.

It will be noted that where there are clutch rollers of different diameter, as shown in FIG. 23B, the clutch roller line will have jog, as shown at 36p in FIG. 23B.

One of the very useful applications of the present clutch is as a continuously variable transmission. In mechanical power-producing heat engines it is desirable to maintain a high level of thermal efficiency. One way of achieving this is to operate the engine with the throttle opened to the practical limit. The present clutch is ideally adapted to such operation when the control mechanism is used in a following servo loop. However, many, if not most, mechanical power applications which employ such engines have a driven output which must run variably over a broad speed range. A continuously variable transmission (CVT) accommodates this need.

Presently known CVTs have varying output ratios which are a function of either variable pitch diameter ratios, as in traction drives; or by the exchange of variable fluid volumes, as in hydraulic drive arrangements. The present invention, when incorporated into appropriate gearing, provides a method for establishing infinitely variable torque and speed output power ratios.

The clutch of the present invention is particularly efficacious where kinetic energy such as fly wheel energy is to be stored and retrieved. When employed as a continuously variable transmission (CVT) in an automobile, it is used to rapidly pulse inertial energy of an input mass (such as the rotative mass of the engine) to the load, consisting of the automobile wheels. The input mass may consist of the engine crank shaft and other moving parts, either alone or supplemented by a fly wheel. In similar vein, the inherent fly wheel energy in a spinning turbine may provide the necessary inertial energy, which may be selectively and rapidly coupled and decoupled to the output load.

The invention may also be employed and applied to a large number of mechanical power transferring arrangements such as disengageable overrunning clutches.

What is claimed is:

1. A clutch for selectively clutching and declutching a first member and a second member, comprising:
   a rail on said first member;
   a plurality of clutch rollers each in the form of a circular surface of revolution mounted for rotation about clutch roller axes transverse of said rail;
   said clutch roller axes being disposed on a clutch roller line substantially paralleling said rail;
   said clutch rollers being movable toward and away from each other;
   coupling means for coupling said rail and said clutch rollers for applying a rotative torque to said clutch rollers about their respective said axes, upon relative movement between said first member and said clutch rollers whenever said members are in a declutched condition;
   bunching means for causing said clutch rollers to bunch frictionally together and bind against rotation, thereby to lock said first member and said clutch rollers together, and including:
   control means distinct from said first member for selectively causing a control clutch roller at one end of said clutch roller line to move toward and contact the adjacent clutch roller; and
   load means including a load clutch roller disposed at the other end of said clutch roller line, and coupled to said second member for transmitting a load between said members, thereby clutching together said members.

2. Clutch in accordance with claim 1 wherein:
said members are substantially circular and are mounted, one within the other, for rotation about a central axis, said clutch roller line being generally circular and concentric with said central axis.

3. Clutch in accordance with claim 2 wherein:
said clutch roller axes lie substantially in a circular surface of revolution centered on said central axis; and are disposed radially with respect to said central axis;
said clutch rollers are conical in configuration and have gear teeth meshing with one of said members.

4. Clutch in accordance with claim 1 wherein:
said control means comprises means for restraining rotation of said control clutch roller.

5. Clutch in accordance with claim 1 wherein:
said load means comprises an axle constituting the axis of said load clutch roller, and journaled in said second member.

6. Clutch in accordance with claim 1 wherein:
said load means comprises a load clutch gear coupled to said load clutch roller, and complementary gear teeth on said second member meshing with said load clutch gear.

7. Clutch in accordance with claim 1 wherein:
said control means comprises means for imparting rotation to said control clutch roller; whereby if the rate of said rotation is less than that imparted to said control clutch roller by said first member, said control clutch roller is moved toward, and into binding contact with, the adjacent clutch roller and the clutch is in engaged mode; and if the rate of said rotation is greater than that imparted to said control clutch roller by said first member, said control clutch roller is moved away from the adjacent clutch roller and the clutch is in disengaged mode.

8. Clutch in accordance with claim 1 wherein:

said coupling means comprises a plurality of traction rollers mounted for rotation about traction axes transverse of said rail;

said traction axes being disposed on a traction roller line located between said clutch roller line and said rail;

said traction rollers having a contact surface in rolling engagement with said rail and said clutch rollers;

said first member having a contact surface paralleling said rail;

said clutch rollers include a surface in rolling engagement with said contact surface;

the distance between said contact surface and said rail being less than the sum of the diameters of said clutch roller surfaces and the respective traction roller contact surface;

whereby a wedging action may be effected between each said traction roller surface and said rail, and between each said clutch roller surface and said contact surface, thereby to couple together said members.

9. A clutch comprising:

a first member having a rail a plurality of clutch rollers mounted for rotation about clutch roller axes transverse of said rail;

said clutch roller axes being disposed on a clutch roller line substantially paralleling said rail;

said clutch rollers being movable toward and away from each other;

coupling means for coupling said rail and said clutch rollers for imparting rotation to said clutch rollers upon relative movement between said first member and said clutch rollers and including meshing gear teeth on said rail and certain of said clutch rollers;

bunching means for causing said clutch rollers to bunch frictionally together and bind against rotation, thereby to lock said first member and said clutch rollers together, and including:

control means for causing a control clutch roller at one end of said clutch roller line to move toward and contact the adjacent clutch roller;

a second member at the other end of said clutch roller line and load means including a load clutch roller adjacent said second member for transmitting a load between said members.

10. A clutch comprising:

a rotatably mounted shaft member having a pair of axially spaced flanges;

a cylindrical member mounted for rotation co-axially circumjacent said shaft member, leaving an annular space between said shaft member and said cylindrical member;

a plurality of clutch rollers extending between said flanges in said annular space and having axes paralleling the axis of said shaft member and said cylindrical member, the axes of said clutch rollers being disposed on a generally circular clutch roller line; said clutch rollers being rotatable and being translatable toward and away from each other along said clutch roller line;

coupling means for coupling said cylindrical member and said clutch rollers for imparting rotation to said clutch rollers upon relative rotation between said cylindrical member and said shaft member;

bunching means for causing said clutch rollers to bunch frictionally together along said clutch roller line and bind against rotation, thereby to lock said cylindrical member and said shaft member together;

said bunching means including control means for causing a control clutch roller at one end of said clutch roller line to move toward and contact the adjacent clutch roller; and a load clutch roller at the other end of said clutch roller line for transmitting load between said cylindrical member and said shaft member.

11. A clutch comprising:

a rotatably mounted shaft member having a pair of axially spaced flanges;

a cylindrical member mounted for rotation co-axially circumjacent said shaft member, leaving an annular space between said shaft member and said cylindrical member;

a plurality of clutch rollers extending between said flanges in said annular space and having axes paralleling the axis of said shaft member and said cylindrical member, the axes of said clutch rollers being disposed on a generally circular clutch roller line; said clutch rollers being rotatable and being translatable toward and away from each other along said clutch roller line;

coupling means for coupling said cylindrical member and said clutch rollers for imparting rotation to said clutch rollers upon relative rotation between said cylindrical member and said shaft member and including internal rack teeth on said cylindrical member and meshing gear teeth on certain of said clutch rollers;

bunching means for causing said clutch rollers to bunch frictionally together along said clutch roller line and bind against rotation, thereby to lock said cylindrical member and said shaft member together;

said bunching means including control means for causing a control clutch roller at one end of said clutch roller line to move toward and contact the adjacent clutch roller; and a load clutch roller at the other end of said clutch roller line for transmitting load between said cylindrical member and said shaft member.

12. Continuously variable transmission, comprising:

frame means;

first and second shaft means journalled in said frame means;

a clutch comprising a first member coupled to said first shaft means and having a rail;

a second member coupled to said second shaft means;

a plurality of clutch rollers mounted for rotation about clutch roller axes tranverse of said rail;

said clutch roller axes being disposed on a clutch roller line substantially paralleling said rail;

said clutch rollers being movable toward and away from each other;

coupling means for coupling said rail and said clutch rollers for applying a rotative torque to said clutch rollers about their respective said axes, upon relative movement between said first member and said clutch rollers whenever said members are in a declutched condition;

bunching means for causing said clutch rollers to bunch frictionally together and bind against rotation, thereby to lock said first member and said clutch rollers together, and including:

clutch control means distinct from said first member for selectively causing a control clutch roller at one end of said clutch roller line to move toward and contact the adjacent clutch roller;

load means including a load clutch roller disposed at the other end of said clutch roller line and coupled to said second member for transmitting a load between said members; and variable speed control means coupled to said clutch control means.

13. A clutch for selectively clutching and declutching a first member and a second member comprising:

a rail on said first member;

a plurality of clutch rollers each in the form of a circular surface of revolution mounted for rotation about clutch roller axes transverse of said rail;

said clutch roller axes being disposed on a clutch roller line substantially paralleling said rail;

said clutch rollers being movable toward and away from each other;

coupling means for coupling said rail and said clutch rollers for applying a rotative torque to said clutch rollers about their respective said axes, upon relative movement between said first member and said clutch rollers whenever said members are in a declutched condition;

bunching means for causing said clutch rollers to bunch frictionally together and bind against rotation, thereby to lock said first member and said clutch rollers together, and including:

control means distinct from said first member for selectively causing a control clutch roller at one end of said clutch roller line to move toward and contact the adjacent clutch roller or move away from and out of contact with said adjacent clutch roller; and load means including a load clutch roller disposed at the other end of said clutch roller line and coupled to said second member for transmitting a load between said members, thereby clutching together said members.

14. A clutch comprising:

a first member having a rail;

a plurality of clutch rollers mounted for rotation about clutch roller axes transverse of said rail;

said clutch roller axes being disposed on a clutch roller line substantially paralleling said rail;

said clutch roller being movable toward and away from each other;

coupling means for coupling said rail and said clutch rollers for imparting rotation to said clutch rollers upon relative movement between said first member and said clutch rollers and including meshing gear teeth on said rail and certain of said clutch rollers;

bunching means for causing said clutch rollers to bunch frictionally together and bind against rotation, thereby to lcok said first member and said clutch rollers together, and including:

control means for causing a control clutch roller at one end of said clutch roller line to selectively move toward and contact the adjacent clutch roller or move away from and out of contact with said adjacent clutch roller;

a second member at the other end of said clutch roller line; and load means including a load clutch roller adjacent said second member for transmitting a load between said members.

15. A clutch for selectively clutching and declutching a first member and a second member comprising:

a rail on said first member;

a plurality of clutch rollers each in the form of a circular surface of revolution mounted for rotation about clutch roller axes transverse of said rail;

said clutch roller axes being disposed on a clutch roller line substantially paralleling said rail;

said clutch rollers being movable toward and away from each other;

coupling means for coupling said rail and said clutch rollers for applying a rotative torque to said clutch rollers about their respective said axes, upon relative movement between said first member and said clutch rollers whenever said members are in a declutched condition;

bunching means for causing said clutch rollers to bunch frictionally together and bind against rotation, thereby to lock said first member and said clutch rollers together, and including:

control means distinct from said first member for selectively causing a control clutch roller at one end of said clutch roller line to selectively move away from and out of contact with said adjacent clutch roller thereby declutching said members; and load means including a load clutch roller disposed at the other end of said clutch roller line and coupled to said second member for transmitting a load between said members, thereby clutching together said members.

16. A clutch comprising:

a first member having a rail;

a plurality of clutch rollers mounted for rotation about clutch roller axes transverse of said rail;

said clutch roller axes being disposed on a clutch roller line substantially paralleling said rail;

said clutch rollers being movable toward and away from each other;

coupling means for coupling said rail and said clutch rollers for imparting rotation to said clutch rollers upon relative movement between said first member and said clutch rollers and including meshing gear teeth on said rail and certain of said clutch rollers;

bunching means for causing said clutch rollers to bunch frictionally together and bind against rotation, thereby to lcok said first member and said clutch rollers together, and including:

control means for causing a control clutch roller at one end of said clutch roller line to selectively move away from and out of contact with said adjacent clutch roller;

a second member at the other end of said clutch roller line; and load means including a load clutch roller adjacent said second member for transmitting a load between said members.

* * * * *